United States Patent
Perera et al.

(10) Patent No.: US 11,594,733 B1
(45) Date of Patent: Feb. 28, 2023

(54) AQUEOUS-BASED SOLID POLYMER SUSPENSIONS IN A POLYMER SOLUTION AS A BINDER FOR SI DOMINANT ANODES

(71) Applicant: Enevate Corporation, Irvine, CA (US)

(72) Inventors: Sanjaya Perera, Irvine, CA (US); Benjamin Yong Park, Irvine, CA (US); Rahul Kamath, Irvine, CA (US); Younes Ansari, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 17/733,696

(22) Filed: Apr. 29, 2022

(51) Int. Cl.
| | |
|---|---|
| H01M 4/62 | (2006.01) |
| H01M 4/134 | (2010.01) |
| H01M 4/38 | (2006.01) |
| H01M 4/1395 | (2010.01) |
| H01M 4/04 | (2006.01) |
| H01M 10/0525 | (2010.01) |
| H01M 4/02 | (2006.01) |

(52) U.S. Cl.
CPC ......... *H01M 4/622* (2013.01); *H01M 4/0404* (2013.01); *H01M 4/0471* (2013.01); *H01M 4/134* (2013.01); *H01M 4/1395* (2013.01); *H01M 4/386* (2013.01); *H01M 4/625* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 6,723,785 B2 | 4/2004 | Hama et al. | |
| 10,840,512 B1 * | 11/2020 | Ansari | H01M 4/364 |
| 2007/0048609 A1 * | 3/2007 | Ueda | H01M 4/1395 429/223 |
| 2013/0316235 A1 * | 11/2013 | Yasuda | H01M 4/0404 429/211 |

FOREIGN PATENT DOCUMENTS

WO   2012082991   6/2012

OTHER PUBLICATIONS

F. Wu et al., Electrochemical Performance of Si Anode Modified with Carbonized Gelatin Binder, J. Power Sources, 2016, vol. 325, pp. 630-636.
Q. Wang et al., A Binder-Free Si-Based Anode for Li-Ion Batteries, RSC Adv., 2015, vol. 5, pp. 15940-15943.
S. Carroccio et al., Thermal Degradation Mechanisms of Polyetherimide Investigated by Direct Pyrolysis Mass Spectrometry, Macromolecular Chemistry and Physics, 1999, vol. 200, Issue 10, pp. 2345-2355.

* cited by examiner

*Primary Examiner* — Carlos Barcena
(74) *Attorney, Agent, or Firm* — McAndrews, Held & Malloy, Ltd.

(57) ABSTRACT

Systems and methods utilizing aqueous-based polymer binders for silicon-dominant anodes may include an electrode coating layer on a current collector, where the electrode coating layer is formed from silicon and an aqueous-based suspension-solution binder composition comprising a water soluble (aqueous-based) polymer as part of a multi-component binder composition that also contains an water insoluble polymer. The electrode coating layer may include more than 70% silicon and the anode may be in a lithium ion battery.

14 Claims, 12 Drawing Sheets

AQUEOUS-BASED SOLID POLYMER SUSPENSIONS IN A POLYMER SOLUTION AS A BINDER FOR SI DOMINANT ANODES

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to using solid polymer suspensions in a polymer solution to fabricate silicon-based anode materials.

BACKGROUND

Conventional approaches for battery electrodes may be costly, cumbersome, and/or inefficient—e.g., they may be complex and/or time-consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for using water insoluble polymers in aqueous based electrodes, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1A:
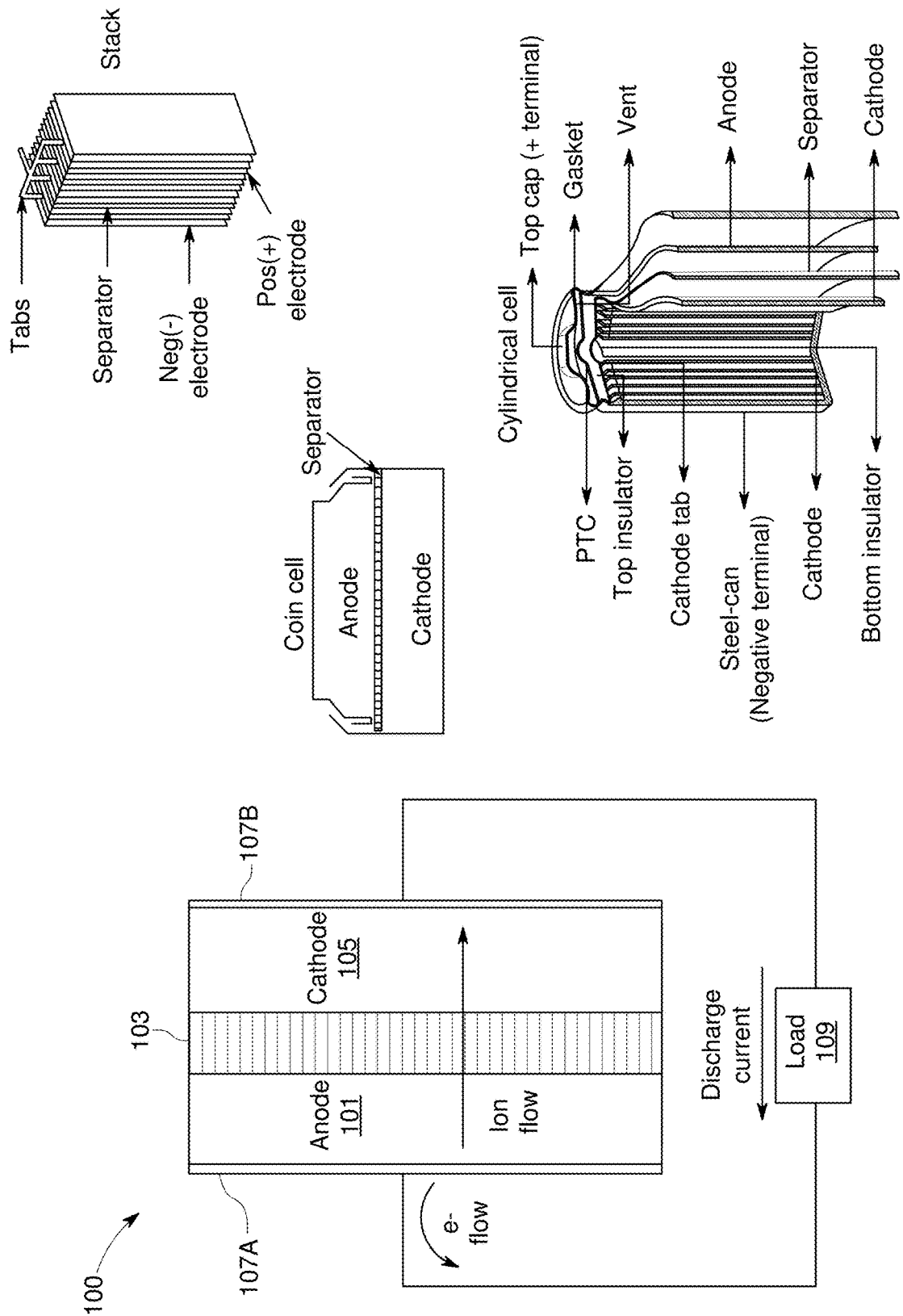
FIGS. 1A and 1B illustrate diagrams of a battery (FIG. 1A) and a battery management system (FIG. 1B), in accordance with an example embodiment of the disclosure.

FIG. 1A illustrates an example battery. Referring to FIG. 1A, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the battery 100 shown in FIG. 1A is a very simplified example merely to show the principle of operation of a lithium-ion cell. Examples of realistic structures are shown to the right in FIG. 1A, where stacks of electrodes and separators are utilized, with electrode coatings typically on both sides of the current collectors except, in certain cases, the outermost electrodes. The stacks may be formed into different shapes, such as a coin cell, cylindrical cell, prismatic pouch cell, or prismatic metal can cell, for example.

The development of portable electronic devices and electrification of transportation drive the need for high-performance electrochemical energy storage. In devices ranging from small-scale (<100 Wh) to large-scale (>10 kWh), Li ion batteries are widely used over other rechargeable battery chemistries due to their advantages in energy density and cyclability.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode 105 are electrically coupled to the current collectors 107A and 107B, which comprise metal or other conductive material for providing electrical contact to the electrodes as well as physical support for the active material in forming electrodes.

The configuration shown in FIG. 1A illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. In this regard, different methods or processes may be used in forming electrodes, particularly silicon-dominant (>50% in terms of active material by capacity or by weight) anodes. For example, lamination or direct coating may be used in forming a silicon-containing anode (silicon anode). Examples of such processes are illustrated in and described with respect to FIGS. 2 and 3. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO4$, LiFSI, LiTFSI, etc. In an example scenario, the electrolyte may comprise Lithium hexafluorophosphate ($LiPF_6$) and lithium bis(trifluoromethanesulfonyl)imide (LiTFSI) that may be used together in a variety of electrolyte solvents. Lithium hexafluorophosphate ($LiPF_6$) may be present at a concentration of about 0.1 to 4.0 molar (M) and lithium bis(trifluoromethanesulfonyl)imide (LiTFSI) may be present at a concentration of about 0 to 4.0 molar (M). Solvents may comprise one or more cyclic carbonates, such as ethylene carbonate (EC), fluoroethylene carbonate (FEC), or propylene carbonate (PC) as well as linear carbonates, such as ethyl methyl carbonate (EMC), diethyl carbonate (DEC), and dimethyl carbonate (DMC), in various percentages. In some embodiments, the electrolyte solvents may comprise one or more of EC from about 0-40%, FEC from about 2-40% and/or EMC from about 50-70% by weight.

The separator 103 may be soaked with a liquid or gel electrolyte. In addition, in an example embodiment, the separator 103 does not melt below about 100 to 140° C., and exhibits sufficient mechanical properties for battery applications. A battery, in operation, can experience expansion and contraction of the anode 101 and/or the cathode 105. In an example embodiment, the separator 103 can expand and contract by at least about 5 to 10% without tearing or otherwise failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material and a current collector, such as a copper sheet. Carbon is often used because it has excellent electrochemical properties and is also electrically conductive. Anode electrodes currently used in rechargeable lithium-ion cells typically have a specific capacity of approximately 200 milliamp hours per gram (mAh/g). Graphite, the active material used in most lithium-ion battery anodes, has a theoretical energy density of 372 mAh/g. In comparison, silicon has a high theoretical capacity of 4200 mAh/g. In order to increase volumetric and gravimetric energy density of lithium-ion batteries, silicon may be used as the active material for the cathode 105 or anode 101. Si anodes may be in the form of a composite on a current collector, with >50% Si by capacity or weight in the composite layer.

In an example scenario, the anode 101 and cathode 105 store the ions used for separation of charge, such as lithium ions. In this example, the electrolyte carries positively charged lithium ions from the anode 101 to the cathode 105 in discharge mode, as shown in FIG. 1A, and vice versa through the separator 103 in charge mode. The movement of the lithium ions and reactions with the electrodes create free electrons in one electrode which creates a charge at the opposite current collector. The electrical current then flows from the current collector where charge is created through the load 109 to the other current collector. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 through the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density and high power density of lithium-ion batteries are achieved with the development of high-capacity and high-voltage cathodes, high-capacity anodes and electrolytes with high voltage stability and interfacial compatibility with electrodes. Functionally non-flammable or less-flammable electrolytes could be used to improve safety. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be improved by incorporating conductive additives with different morphological properties. Carbon black (Super P), vapor grown carbon fibers (VGCF), and a mixture of the two have previously been incorporated into the anode to improve electrical conductivity and otherwise improve performance. The synergistic interactions between the two carbon materials may facilitate electrical contact throughout the large volume changes of the silicon anode during charge and discharge as well as provide additional mechanical robustness to the electrode and provide mechanical strength (e.g., to keep the electrode material in place). These contact points (especially when utilizing high-aspect-ratio conductive materials) facilitate the electrical contact between anode material and current collector to mitigate the isolation (island formation) of the electrode material while also improving conductivity in between silicon regions. Graphenes and carbon nanotubes may be used because they may show similar benefits. Thus, in some instances, a mixture of two or more of carbon black, vapor grown carbon fibers, graphene, and carbon nanotubes may be used independently or in combinations for the benefits of conductivity and other performance.

State-of-the-art lithium-ion batteries typically employ a graphite-dominant anode which is a lithium intercalation type anode. Silicon-dominant anodes, however, offer improvements compared to graphite-dominant Li-ion batteries. Silicon exhibits both higher gravimetric (4200 mAh/g vs. 372 mAh/g for graphite) and volumetric capacities (2194 mAh/L vs. 890 mAh/L for graphite). In addition, Si has a higher redox reaction potential versus Li compared to graphite, with a voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life. Therefore, silicon anodes require a strong conductive matrix that (a) holds silicon particles together in the anode, (b) is flexible enough to accommodate the large volume expansion and contraction of silicon, and (c) allows a fast conduction of electrons within the matrix. Binders may be used in anode technologies to maintain the integrity of the anode during excessive volume changes during lithiation.

Therefore, there is a trade-off among the functions of active materials, conductive additives and polymer binders. The balance may be adversely impacted by high energy density silicon anodes with low conductivity and huge volume variations described above. Polymer binder(s) may be pyrolyzed to create a pyrolytic carbon matrix with embedded silicon particles. In addition, the polymers may be selected from polymers that are completely or partially soluble in water or other environmentally benign solvents or mixtures and combinations thereof. Polymer suspensions of materials that are non-soluble in water could also be utilized.

In some embodiments, dedicated systems and/or software may be used to control and manage batteries or packs thereof. In this regard, such dedicated systems may comprise suitable circuitry for running and/or executing control and manage related functions or operations. Further, such software may run on suitable circuitry, such as on processing circuitry (e.g., general processing units) already present in the systems or it may be implemented on dedicated hardware. For example, battery packs (e.g., those used in electric vehicles) may be equipped with a battery management system (BMS) for managing the batteries (or packs) and operations. An example battery management system (BMS) is illustrated in and described in more detail with respect to FIG. 1B.

Figure 1B:
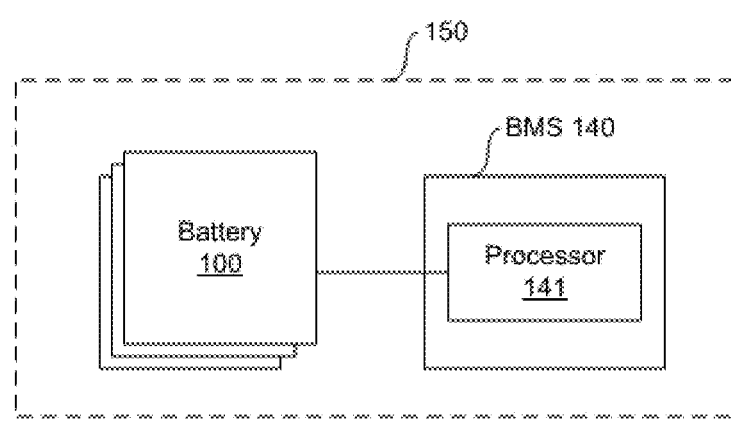

FIG. 1B illustrates an example battery management system (BMS) for use in managing operation of batteries. Shown in FIG. 1B is battery management system (BMS) 140.

The battery management system (BMS) 140 may comprise suitable circuitry (e.g., processor 141) configured to manage one or more batteries (e.g., each being an instance of the battery 100 as described with respect with FIG. 1A). In this regard, the BMS 140 may be in communication and/or coupled with each battery 100. In some implementations, a separate processor (e.g., a conventional processor, such as an electronic control unit (ECU), a microcontroller unit (ECU), or the like), or several such separate processors, may be used, and may be configured to handle algorithms or control functions with regards to the batteries. In such implementations, such processor(s) may be connected to the batteries, such as through the processor 141, and thus may be treated as part of the BMS 140 and acting as part of processor 141.

In some embodiments, the battery 100 and the BMS 140 may be in communication and/or coupled with each other, for example, via electronics or wireless communication. In some embodiments, the BMS 140 may be incorporated into the battery 100. Alternatively, in some embodiments, the BMS 140 and the battery 100 may be combined into a common package 150. Further, in some embodiments, the BMS 140 and the battery 100 may be separate devices/components, and may only be in communication with one another when present in the same system. The disclosure is not limited to any particular arrangement, however.

Figure 2:
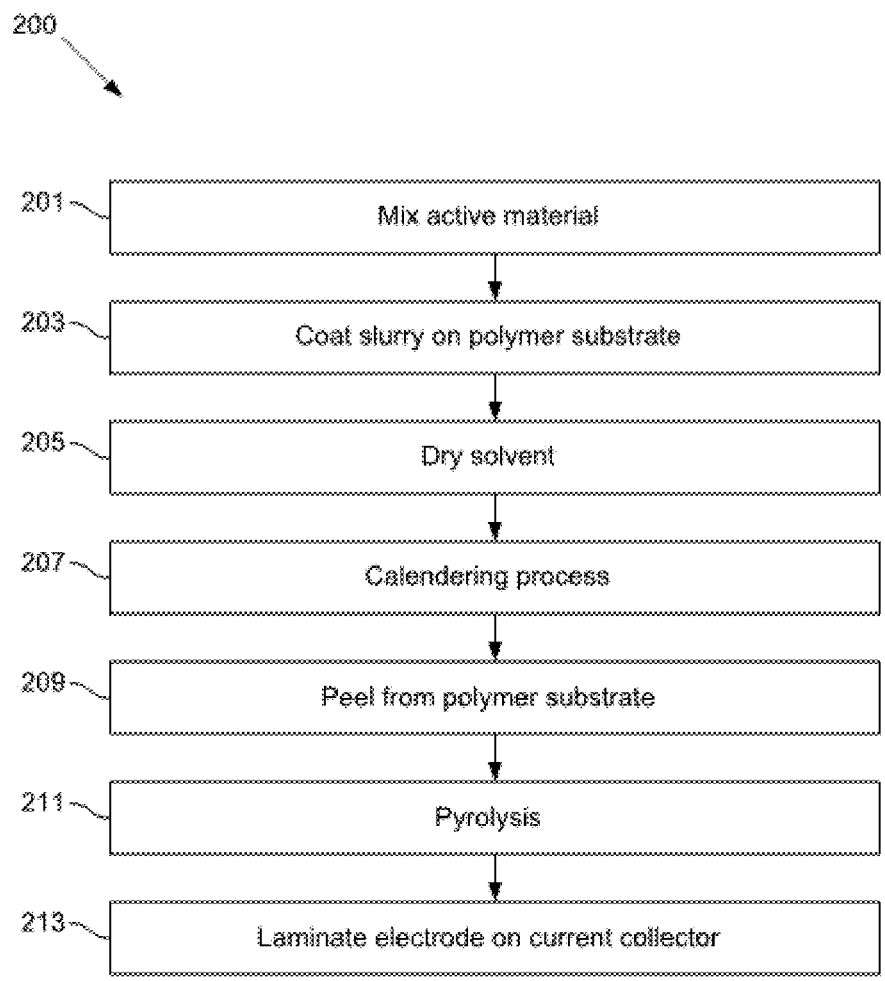
FIG. 2 is a flow diagram of an example lamination process for forming a silicon-dominant anode cell, in accordance with an example embodiment of the disclosure.

FIG. 2 is a flow diagram of an example lamination process for forming a silicon-dominant anode cell. This process employs an optional high-temperature pyrolysis process on a substrate, layer removal, and a lamination process to adhere the active material layer to a current collector. This strategy may also be adopted by other types of anodes, such as graphite, conversion type anodes, such as transition metal oxides, transition metal phosphides, and other alloy type anodes, such as Sn, Sb, Al, P, etc.

To fabricate an anode, the raw electrode active material is mixed in step 201. In the mixing process, the active material may be mixed with a binder/resin (such as water soluble PI (polyimide), PAI (polyamideimide), carboxymethyl cellulose (CMC), styrene-butadiene rubber (SBR), poly(acrylic acid) (PAA), Sodium Alginate, Phenolic or other water soluble resins and mixtures and combinations thereof), solvent, rheology modifiers, surfactants, pH modifiers, and conductive additives. The materials may comprise carbon nanotubes/fibers, graphene sheets, metal polymers, metals, semiconductors, and/or metal oxides, for example. Silicon powder with a 1-30 or 5-30 μm particle size, for example, may then be dispersed in polyamic acid resin, PAI, or PI (15-25% solids in N-Methyl pyrrolidone (NMP) or deionized (DI) water) at, e.g., 1000 rpm for, e.g., 10 minutes, and then the conjugated carbon/solvent slurry may be added and dispersed at, e.g., 2000 rpm for, e.g., 10 minutes to achieve a slurry viscosity within 2000-4000 cP and a total solid content of about 30-40%. The pH of the slurry can be varied from acidic to basic, which may be beneficial for controlling the solubility, conformation, or adhesion behavior of water soluble polyelectrolytes, such as polyamic acid, carboxymethyl cellulose, or polyacrylic acid. Ionic or non-ionic surfactants may be added to facilitate the wetting of the insoluble components of the slurry or the substrates used for coating processes. The particle size and mixing times may be varied to configure the electrode coating layer density and/or roughness.

Furthermore, cathode electrode coating layers may be mixed in step 201, and coated (e.g., onto aluminum), where the electrode coating layer may comprise cathode material mixed with carbon precursor and additive as described above for the anode electrode coating layer. The cathode material may comprise Lithium Nickel Cobalt Manganese Oxide (NMC (also called NCM): $LiNi_xCo_yMn_zO_2$, $x+y+z=1$), Lithium Iron Phosphate (LFP: $LiFePO_4/C$), Lithium Nickel Manganese Spinel (LNMO: e.g. $LiNi_{0.5}Mn_{1.5}O_4$), Lithium Nickel Cobalt Aluminum Oxide (NCA: $LiNi_aCo_bAl_cO_2$, $a+b+c=1$), Lithium Manganese Oxide (LMO: e.g. $LiMn_2O_4$), a quaternary system of Lithium Nickel Cobalt Manganese Aluminum Oxide (NCMA: e.g. $Li[Ni_{0.89}Co_{0.05}Mn_{0.05}Al_{0.01}]O_2$, Lithium Cobalt Oxide (LCO: e.g. $LiCoO_2$), and other Li-rich layer cathodes or similar materials, or combinations thereof. The particle size and mixing times may be varied to configure the electrode coating layer density and/or roughness.

In step 203, the slurry may be coated on a substrate. In this step, the slurry may be coated onto a polyester, polyethylene terephthalate (PET), or Mylar film at a loading of, e.g., 2-4 mg/cm$^2$ and then undergo drying in step 205 to an anode coupon with high Si content and less than 15% residual solvent content. This may be followed by an optional calendering process in step 207, where a series of hard pressure rollers may be used to finish the film/substrate into a smoothed and denser sheet of material.

In step 209, the active-material-containing film may then be removed from the PET, where the active material layer may be peeled off the polymer substrate. The peeling may be followed by a pyrolysis step 211 where the material may be heated to, e.g., 600-1250° C. for 1-3 hours, cut into sheets, and vacuum dried using a two-stage process (120° C. for 15 h, 220° C. for 5 h). The peeling process may be skipped if polypropylene (PP) substrate is used, and PP can leave ~2% char residue upon pyrolysis. Also, the active material layer may be used without pyrolysis.

In step 213, the electrode material may be laminated on a current collector. For example, a 5-20 μm thick copper foil may be coated with polyamide-imide with a nominal loading of, e.g., 0.2-0.6 mg/cm2 (applied as a 6 wt % varnish in NMP and dried for, e.g., 12-18 hours at, e.g., 110° C. under vacuum). The anode coupon may then be laminated on this adhesive-coated current collector. In an example scenario, the silicon-carbon composite film is laminated to the coated copper using a heated hydraulic press. An example lamination press process comprises 30-70 seconds at 300° C. and 3000-5000 psi, thereby forming the finished silicon-composite electrode.

The cell may be assessed before being subject to a formation process. The measurements may comprise impedance values, open circuit voltage, and electrode and cell thickness measurements. The formation cycles are defined as any type of charge/discharge of the cell that is performed to prepare the cell for general cycling and is considered part of the cell production process. Different rates of charge and discharge may be utilized in formation steps. During formation, the initial lithiation of the anode may be performed, followed by delithiation. Cells may be clamped during formation and/or cycling.

Figure 3:
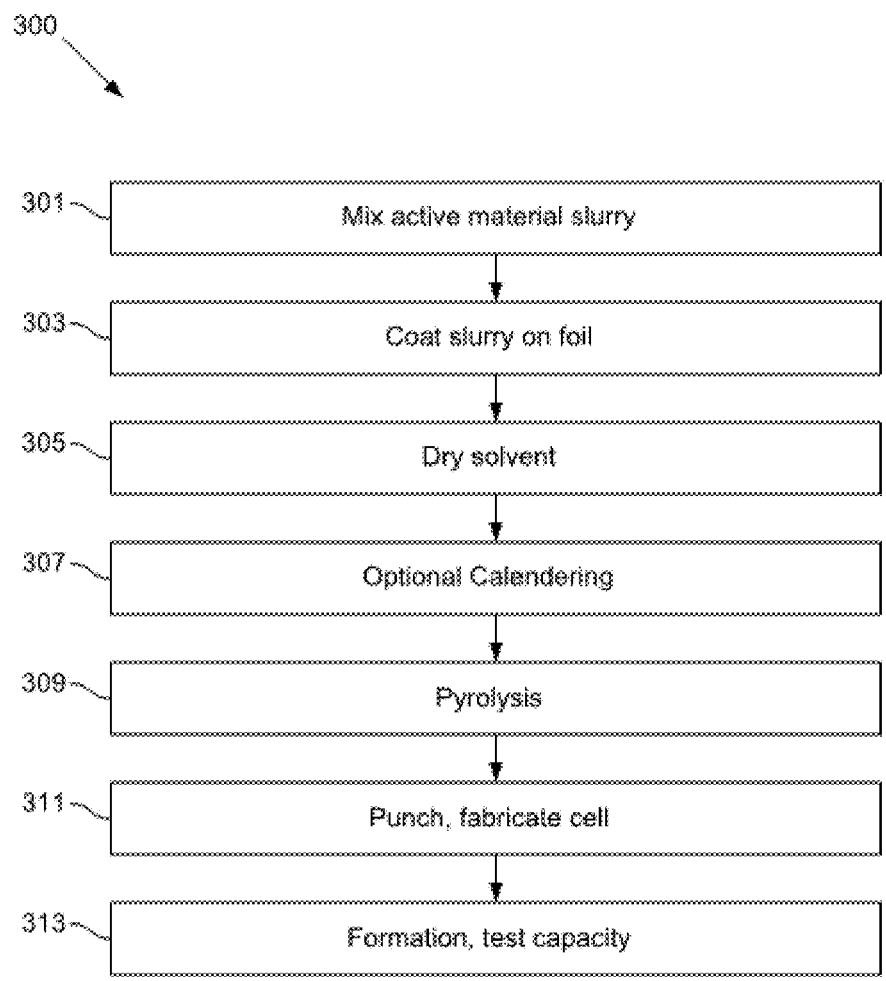
FIG. 3 is a flow diagram of an example direct coating process for forming a silicon-dominant anode cell, in accordance with an example embodiment of the disclosure.

FIG. 3 is a flow diagram of a direct coating process for forming a silicon-dominant anode cell, in accordance with an example embodiment of the disclosure. This process comprises physically mixing the active material, conductive additive, and binder together, and coating the mixed slurry directly on a current collector before optional pyrolysis. This example process comprises a direct coating process in which an anode or cathode slurry is directly coated on a copper foil using a binder such as CMC, SBR, PAA, Sodium Alginate, PAI, PI and mixtures and combinations thereof.

In step 301, the active material may be mixed with, e.g., a binder/resin (such as PI, PAI or phenolic), solvent (such as NMP, water, other environmentally benign solvents or their mixtures and combinations thereof), and conductive additives. The materials may comprise carbon nanotubes/fibers, graphene sheets, metal polymers, metals, semiconductors, and/or metal oxides, for example. Silicon powder with a 1-30 μm particle size, for example, may then be dispersed in polyamic acid resin, PAI, PI (15% solids in DI water or N-Methyl pyrrolidone (NMP)) at, e.g., 1000 rpm for, e.g., 10 minutes, and then the conjugated carbon/solvent slurry may be added and dispersed at, e.g., 2000 rpm for, e.g., 10 minutes to achieve a slurry viscosity within 2000-4000 cP and a total solid content of about 30-40%.

Furthermore, cathode active materials may be mixed in step 301, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 303, the slurry may be coated on a copper foil. In the direct coating process described here, an anode slurry is coated on a current collector with residual solvent followed by a drying and a calendering process for densification. An optional pyrolysis step (~500-800° C.) is then applied such that carbon precursors are partially or completely converted into glassy carbon or pyrolytic carbon. Similarly, cathode active materials may be coated on a foil material, such as aluminum, for example. The active material layer may undergo a drying process in step 305 to reduce residual solvent content. An optional calendering process may be utilized in step 307 where a series of hard pressure rollers may be used to finish the film/substrate into a smoother and denser sheet of material. In step 307, the foil and coating optionally proceeds through a roll press for calendering where the surface is smoothed out and the thickness is controlled to be thinner and/or more uniform.

In step 309, the active material may be pyrolyzed by heating to 500-1000° C. such that carbon precursors are partially or completely converted into glassy carbon. Pyrolysis can be done either in roll form or after punching. If the electrode is pyrolyzed in a roll form, it will be punched into individual sheets after pyrolysis. The pyrolysis step may result in an anode active material having silicon content greater than or equal to 50% by capacity or by weight. In an example scenario, the anode active material layer may comprise 20 to 95% silicon. In another example scenario may comprise 50 to 95% silicon by weight. In instances where the current collector foil is not pre-punched/pre-perforated, the formed electrode may be perforated with a punching roller, for example. The punched anodes may then be used to assemble a cell with cathode, separator and electrolyte materials. In some instances, separator with significant adhesive properties may be utilized.

In step 313, the cell may be assessed before being subject to a formation process. The measurements may comprise impedance values, open circuit voltage, and cell and/or electrode thickness measurements. During formation, the initial lithiation of the anode may be performed, followed by delithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in formation steps.

Recently Si has been one of the most promising candidates for preparing anodes for next-generation lithium-ion batteries especially due to its exceptionally high capacity and high energy density compared with the conventional graphite based anodes. Despite the interesting electrochemical properties, Si has unique challenges that needs to be addressed before introducing as the dominant component in Li-ion battery anodes. Si shows large volumetric changes upon Li alloying and de-alloying, which needs special electrode designs before introducing to EV (Electric Vehicle) industry.

Among the recent advancements in silicon-based anode development, one is the direct coated anode using organic solvent-based binders followed by heat treatment to convert the binder into a carbon matrix. However, these standard organic based binders and organic (non-aqueous) solvents used to manufacture anodes have challenges associated with their toxicity and high cost. The present disclosure addresses the following key advancements: (1) the use of environmentally friendly water-based anode processing and scalability; (2) the capability of developing anodes with high Si content >70 wt. % for high capacity; and (3) the development of a cost effective process by using direct coated anode followed by optional heat treatment to convert binder to pyrolytic carbon matrix. The partially carbonized polymer acts as a both binder and a conductive network in the Si anode.

Currently, polymeric binders are used in almost all silicon anode technologies to keep the integrity of the anode during excessive volume changes during lithiation. Although polyvinylidene difluoride (PVDF) is commonly used in graphite cells, it is not capable of handling the excessive volume changes of silicon. Additionally, PVDF is soluble only in toxic organic solvents such as NMP, which require solvent recovery systems to recycle the solvent. In an example scenario, polymeric binders that are capable of mitigating the capacity fade of Si anodes occurring at a high rate and long-term cycling are disclosed. Water-based anode fabrication is of interest for large scale manufacturing of anodes to reduce the cost and eliminate the use of toxic solvents. Objectives of a aqueous-based anode polymer include: (1) ease of processing—the polymer being highly soluble in water allowing for ease of adjusting viscosity during coating; (2) high char yield (carbon yield) and film-forming properties upon pyrolysis to create a conductive matrix around and between silicon particles; (3) a homogeneous distribution of polymeric components in water and the slurry without phase separation during the slurry formulation or coating; and (4) relatively low pyrolysis temperature that is compatible with the thermal behavior of the associated current collector. Note that aqueous-based materials are also referred to as water-based or water-soluble, these are materials that are partially or fully soluble in water or an aqueous solution.

Commercially available water-soluble polymers can have significantly low char yield (carbon yield) (<10 wt. %) and develop microcracks during pyrolysis. As a result, these water-soluble polymers exhibit poor mechanical properties in the anode after pyrolysis. Polymer resins and their derivatives with high carbon yield upon pyrolysis are desired to yield a continuous carbon medium while keeping the robustness of the anode. Although available polymers and their blends may be capable of achieving a high char yield, most of these polymers are insoluble in water. Therefore, there is a trade-off among the functions of active materials, conductive additives, and polymer binders. The balance may be adversely impacted by high energy density silicon anodes with low conductivity and huge volume variations described above.

Standard organic based binders and organic (non-aqueous) solvents used to manufacture anodes have challenges associated with their toxicity and high cost. This disclosure addresses this issue through the use of water-soluble (aqueous-based) polymers as binders to fabricate silicon-based anode materials, where the binders are a composition containing the water-soluble polymers along with an insoluble component. These binders may also include various modifiers and/or additives in order to achieve the desired properties. These modifiers and/or additives may assist in any or all of, stabilizing, strengthening and/or adjusting the properties of the binder and may also serve as a carbon source themselves. In some embodiments, functional aliphatic and aromatic amine compounds serve as additives.

The binder compositions described herein comprise water insoluble polymers in aqueous based anodes by use of a polymer suspension ("solid" phase) in a polymer solution ("liquid" phase). The use of this multi-phase system allows the use of many high char-yield water-insoluble polymers to generate pyrolytic carbon upon pyrolyzation. However, in some embodiments, the binder compositions may be used without pyrolysis. The binder compositions described herein, with or without pyrolysis, afford many advantages over the conventional "liquid" binder approach for preparing Si dominant anodes, including, but not limited to, the following advantages: (1) environmentally friendly aqueous-based anode preparation that is scalable; (2) introduction of polymers that are not soluble in water (which optionally may be a pyrolytic carbon precursor) in combination with water soluble polymer matrix; (3) anodes with high Si content >90 wt. % for high capacity and high energy density; (4) development of Si dominant binder free anodes capable of fast charging (>4 C); and (5) development of cost-effective and scalable Si anodes, since Si microparticles and water as the solvent are used in the anode production.

As discussed above, Li-ion batteries with Si based anodes show a great promise compared with conventional graphite anodes since Si-based anodes have high theoretical capacity and high energy density. During charging and discharging Si anodes form highly lithiated stable lithium silicides that can achieve high rate performance ~10 C. In practical applications, current Li ion batteries comprise of Li-ion battery anodes, which contain significantly small wt. % of Si blended with graphite. Although the presence of Si boosts the capacity, energy density of these anodes are limited. Therefore, the use of Si dominant anodes in Li-ion batteries is hindered by the unique challenges associated with Si such as volume changes during charge and discharge.

As a result of the large volumetric expansion of Si during the charging and discharging (~400%), Si dominant anodes typically show high capacity fading during long term cycling. Volume changes of Si significantly affects the mechanical integrity of the anode, which leads to create islands/material domains within the electrode that are not electrically interconnected. These isolated domains increase the cell impedance and capacity fading over cycling.

Significant stress and strain developed in Lithium silicide ($Li_xSi$) during cycling pulverizes the SEI layer on Si particles exposing the fresh surfaces of Si. As a result of the continued reaction of Si with the electrolyte, a thick and dense SEI layer is formed during the long term cycling and depletes the Li ion reservoir.

Important features for an anode are robust mechanical properties and retention of conductivity over cycling. Although there has been some success with conductive additives such as Super P or carbon black, mitigation of the formation of electrically isolated islands has not been fully addressed. Currently, polymeric binders that are soluble in NMP/organic solvents are used in almost all silicon anode production. However, mitigating the capacity fade of Si anodes (which occurs at a high rate and long-term cycling) is an ongoing issue. Additionally, most current polymer binders require toxic organic solvents such as NMP to dissolve. Solvent recovery systems are typically used in large-scale production of these anodes to recycle the hazardous organic solvents and minimize the environmental impact.

Some water-soluble polymers such as carboxymethyl cellulose (CMC), sucrose, poly(acrylic acid) (PAA), poly(vinyl alcohol) (PVA), starch, chitosan, lignin, and gums (e.g., xanthan gum) have been used as binders for preparing Si anodes. However, these polymers have not created a successful binder system that shows superior electrochemical performance and is capable of large-scale production.

The addition of carbon as a separate entity during anode production shown some effectiveness in improving the cyclability of the cell. As a result of hydrophobicity of carbons leads to phase separate and have weak adhesion to the current collector and to the Si particles, thus leading non-continued carbon media that leads to unacceptable performance. In addition, the existence of a phase separated carbon additives weakens the adhesion of anode materials to the current collector.

The binder plays a crucial role for improving both anode processability and the performance. To address major challenges of Si anodes, there is a need for a binder that processes following characteristics: (1) superior conductivity under high stress-strain conditions during lithiation and de-lithiation steps; (2) physiochemical interaction of the carbon matrix with the surface of Si particles for high rate performance and high efficiency; and (3) environmentally friendly manufacturing process to reduce the cost and eliminate the use of toxic solvents. Conversion of the polymeric binder to pyrolytic carbon via heat treating is important for improving Si anode performance.

As described above, commercially available water-soluble polymers typically have significantly low char yield (carbon yield) (<10 wt. %) and develop microcracks during pyrolysis. Thus prior heat treated/pyrolyzed Si anodes exhibit poor mechanical properties such as adhesion to the current collector. A challenge for aqueous based anode manufacturing is the lack of polymer candidates that are soluble in water and possess high char yield. Polymers such as polyacrylonitrile (PAN), polyetherimide (PEI), PAI (poly amide-imide), polyimines and polyimides (PI) are particularly attractive to use as a pyrolytic carbon structure for Si anodes. Unfortunately, these polymers are insoluble in water and cannot be used alone as a binder with water.

This disclosure addresses this issue through the use of solid polymer suspensions in a polymer solution, which incorporate water-soluble (aqueous-based) polymers (primary polymer) as part of a multi-component binder composition that also contains an insoluble polymer (secondary polymer). In some embodiments, the secondary water-insoluble polymeric component (0.1 to 50% of solids with respect to primary polymer solids) is added to a primary water-soluble polymer solution (10 to 40% of green solids with respect to total solid composition including active materials) to create a binder composition for use in creating aqueous-based anodes. Further polymer components or other additives may also be used.

The disclosed binders are a composition that may comprise a "solid" phase (e.g. water insoluble polymer particle) and a "liquid" phase (e.g. water soluble polymer solution) and these compositions may be in a suspension form that may be solid at room temperature (solid solution). Water may be used as a solvent or other aqueous-based solvent mixtures. The binder may be created as a solution with a percentage of solids therein. During slurry preparation, the binder may be referred to as a solution, although solids may be present. Green solids as referred to above are those solids present in the binder composition before any pyrolysis steps. Dried green solids (or dried solids) are these solids, but with no solvent, and pre-pyrolysis, or, stated another way, dried solids are the binder composition where all solvents have been removed, but before any pyrolysis steps.

Thus solvent weight loss is a separate analysis as compared to weight loss due to pyrolysis. Removal of solvent results in dried solids (dried green solids) which are solids from the polymer components of the binders. The binder composition having dried solids may be used without pyrolysis. If pyrolysis is performed, the char yield is calculated using the amount of the dried solids (dried green solids) as the starting point.

In one embodiment, the binders may be utilized to create an electrode coating layer. This electrode coating layer may be dried, resulting in an electrode coating layer comprising a layer of dried solids (dried green solids) as described above, which may be utilized as an electrode without pyrolyzation. In other embodiments, the electrode coating layer comprising a layer of dried solids is further pyrolyzed into carbon during making of the electrode. In a further embodiment, the electrode coating layer has a char yield (carbon yield) upon pyrolysis of 40-60% by weight (with respect to the dried green solids).

In some embodiments, water-insoluble polymeric particles are suspended in a water-soluble polymer binder solution to prepare a "suspension-solution" binder composition (i.e. solid polymer suspensions in a polymer solution). The aqueous-based suspension-solution binder composition consists of water insoluble polymer particulate/beads/flakes (or combinations of these morphologies) that may be homogeneously distributed within the flowable water soluble polymer solution. The binder composition refers to the polymer suspension in polymer solution in water. These multi-component binder composition anodes are mechanically stable after drying, and may be used with or without pyrolyzation of the anode. The polymer components can range from 5-40% by weight. Storing these suspension-solution compositions below 0° C. solidifies the water, which helps for prolong storage of suspension-solution polymer binder.

Use of the these multi-component binder compositions allows for greatly increased possibilities for polymer compositions, since it is not limited to only water soluble polymers. Water insoluble polymers may be included in the aqueous based binder composition, which can be advantageous for a variety of reasons, including but not limited to generating pyrolytic carbon for an Si anode. The binder compositions also allow for inclusion of a viscous polymer solution by using water as a stable media for water insoluble polymer via physiochemical bonding between polymer components. The primary water-soluble polymer provides all necessary bonding and interactions required to keep water insoluble polymer (particles/beads/flakes) in suspension without settling. Also, during the mixing process, Si itself acts as a beading media for further breaking down solid polymer particles in the slurry which may additionally facilitate the distribution of the solid polymer within the Si anode. In some embodiments, the suspension-solution polymer binders may be used for cathodes or other types of electrodes that are used in energy storage devices.

The disclosed "suspension-solution" binder compositions may be pyrolyzed to convert both polymer components to pyrolytic carbon. Any remaining functional groups after pyrolyzation can improve Si-carbon interactions. Upon pyrolyzation, the water insoluble solid polymer component within the anode provides both pyrolytic carbon and porosity (30 to 60% of the total volume of pyrolyzed anode by calculation) to the anode. Pore size can range from nano-size pores up to micron size pores. These pores can provide space required to accommodate the volume expansion of Si during lithiation and de-lithiation. Additionally, the presence of the pores is favorable for improving electrode-electrolyte interaction, thus decreasing the charge transfer resistance. In other embodiments, the disclosed "suspension-solution" binder compositions may be used without pyrolyzation.

Figure 4:
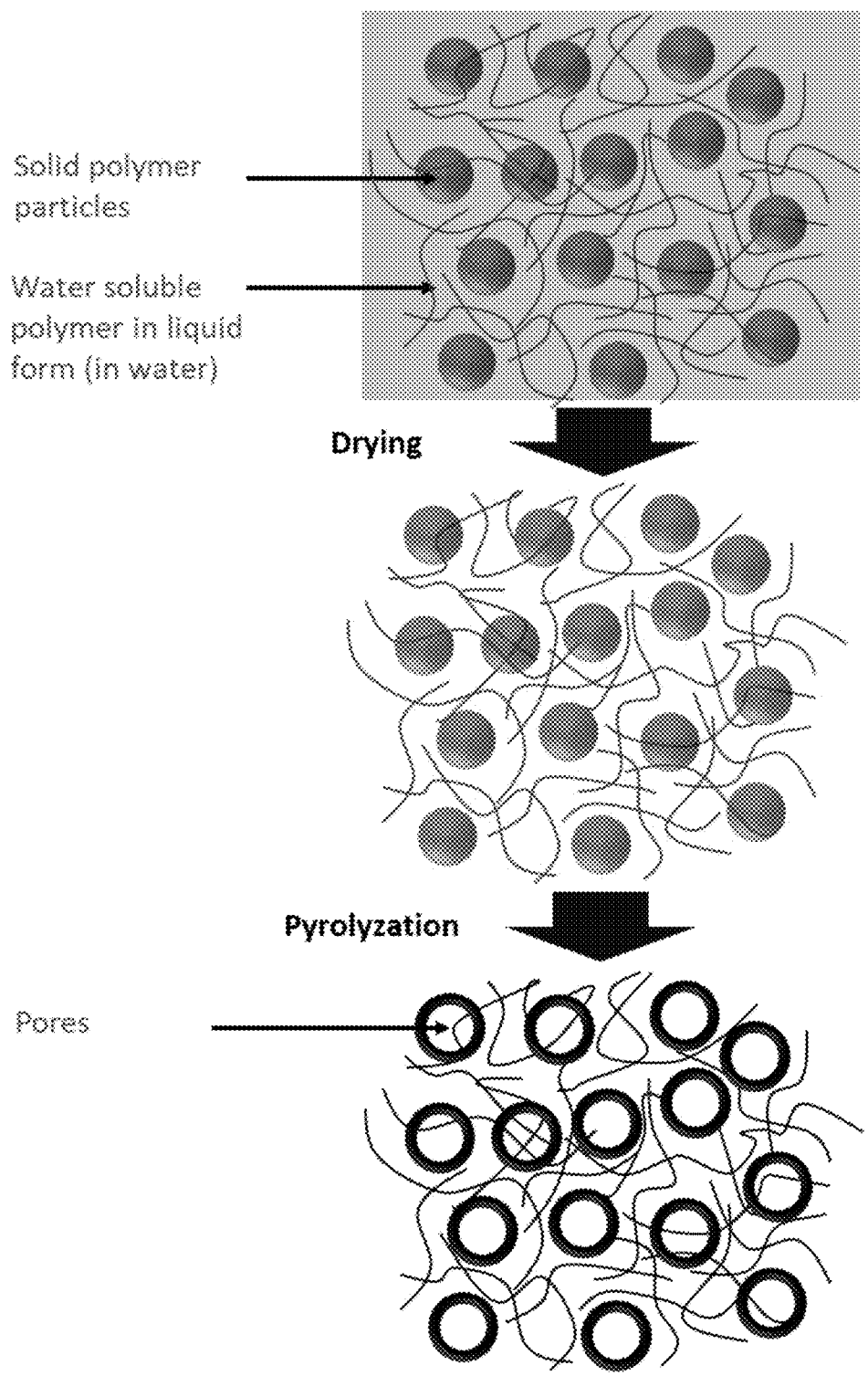
FIG. 4 illustrates the transition of suspension-solution aqueous binder to pyrolytic carbon matrix with pores after pyrolyzation, in accordance with an example embodiment of the disclosure.

FIG. 4 depicts a conceptual diagram of the disclosed "suspension-solution" binder compositions, which illustrates the transition of suspension-solution aqueous binder to pyrolytic carbon matrix with pores after pyrolyzation.

As the demands for both zero-emission electric vehicles and grid-based energy storage systems increase, lower costs and improvements in energy density, power density, and safety of lithium (Li)-ion batteries are highly desirable. Enabling the high energy density and safety of Li-ion batteries requires the development of high-capacity, and high-voltage cathodes, high-capacity anodes, and accordingly functional electrolytes with high voltage stability, interfacial compatibility with electrodes and safety.

A lithium-ion battery typically includes a separator and/or electrolyte between an anode and a cathode. In one class of batteries, the separator, cathode, and anode materials are individually formed into sheets or films. Sheets of the cathode, separator, and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

As discussed above, a lithium-ion battery typically includes a separator and/or electrolyte between an anode and a cathode. Separators may be formed as sheets or films, which are then stacked or rolled with the anode and cathode (e.g., electrodes) to form the battery. The separator may comprise a single continuous or substantially continuous sheet or film, which can be interleaved between adjacent electrodes of the electrode stack. The separator may be configured to facilitate electrical insulation between the anode and the cathode, while still permitting ionic transport. In some embodiments, the separator may comprise a porous material. Functional compounds may be used to modify the separator to prepare different types of functional separators to improve the cycle performance of Li-ion batteries or Li-metal batteries.

Si is one of the most promising anode materials for Li-ion batteries due to its high specific gravimetric and volumetric capacity (discussed above), and low lithiation potential (<0.4 V vs. Li/Li$^+$). Cathode materials may include Lithium Nickel Cobalt Manganese Oxide (NMC (NCM): LiNi$_x$Co$_y$Mn$_z$O$_2$, x+y+z=1); Lithium Iron Phosphate (LFP: LiFePO$_4$/C); Lithium Nickel Manganese Spinel (LNMO: LiNi$_{0.5}$Mn$_{1.5}$O$_4$); Lithium Nickel Cobalt Aluminium Oxide (NCA: LiNi$_a$Co$_b$Al$_c$O$_2$, a+b+c=1); Lithium Manganese Oxide (LMO: LiMn$_2$O$_4$); and Lithium Cobalt Oxide (LCO: LiCoO$_2$).

Among the various cathodes presently available, layered lithium transition-metal oxides such as Ni-rich LiNi$_x$Co$_y$Mn$_z$O$_2$ (NCM, 0≤x, y, z<1) or LiNi$_x$Co$_y$Al$_z$O$_2$ (NCA, 0≤x, y, z<1) are promising ones due to their high theoretical capacity (~280 mAh/g) and relatively high average operating potential (3.6 V vs Li/Li$^+$). In addition to Ni-rich NCM or NCA cathode, LiCoO$_2$ (LCO) is also a very attractive cathode material because of its relatively high theoretical specific capacity of 274 mAh g$^{-1}$, high theoretical volumetric capacity of 1363 mAh cm$^{-3}$, low self-discharge, high discharge voltage, and good cycling performance. Coupling Si anodes with high-voltage Ni-rich NCM (or NCA) or LCO cathodes can deliver more energy than conventional Li-ion batteries with graphite-based anodes, due to the high capacity of these new electrodes. However, both Si-based anodes and high-voltage Ni-rich NCM (or NCA) or LCO cathodes face formidable technological challenges, and long-term cycling stability with high-Si anodes paired with NCM or NCA cathodes has yet to be achieved.

For anodes, silicon-based materials can provide significant improvement in energy density. However, the large volumetric expansion (e.g., >300%) during the Li alloying/dealloying processes can lead to disintegration of the active material and the loss of electrical conduction paths, thereby reducing the cycling life of the battery. In addition, an unstable solid electrolyte interphase (SEI) layer can develop on the surface of the cycled anodes and leads to an endless exposure of Si particle surfaces to the liquid electrolyte. This results in an irreversible capacity loss at each cycle due to the reduction at the low potential where the liquid electrolyte reacts with the exposed surface of the Si anode. In addition, oxidative instability of the conventional non-aqueous electrolyte takes place at voltages beyond 4.5 V, which can lead to accelerated decay of cycling performance. Because of the generally inferior cycle life of Si compared to graphite, only a small amount of Si or Si alloy is used in conventional anode materials.

The cathode (e.g., NCM (or NCA) or LCO) usually suffers from inferior stability and a low capacity retention at a high cut-off potential. The reasons can be ascribed to the unstable surface layer's gradual exfoliation, the continuous electrolyte decomposition, and the transition metal ion dissolution into electrolyte solution; further causes for inferior performance can be: (i) structural changes from layered to spinel upon cycling; (ii) Mn- and Ni-dissolution giving rise to surface side reactions at the graphite anode; and (iii) oxidative instability of conventional carbonate-based electrolytes at high voltage. The major limitations for LCO cathodes are high cost, low thermal stability, and fast capacity fade at high current rates or during deep cycling. LCO cathodes are expensive because of the high cost of Co. Low thermal stability refers to an exothermic release of oxygen when a lithium metal oxide cathode is heated. In order to make good use of Si anode/NCM or NCA cathode, and Si anode/LCO cathode-based Li-ion battery systems, the aforementioned barriers need to be overcome.

As discussed above, Li-ion batteries are being intensively pursued in the electric vehicle markets and stationary energy storage devices. To further improve the cell energy density, high-voltage layered transition metal oxide cathodes, examples including Ni-rich (e.g. NCA, NCM), Li-rich cathodes, and high capacity and low-voltage anodes, such as Si, Ge, etc may be utilized. However, the performance deterioration of full cells, in which these oxides are paired with Si or other high capacity anodes, increases markedly at potentials exceeding 4.30 V, limiting their wider use as high-energy cathode materials. Although a higher Ni content provides a higher specific capacity for Ni-rich NCM or NCA cathodes, it involves surface instability because of the unstable $Ni^{4+}$ increase during the charging process. As it is favorable to convert the unstable $Ni^{4+}$ into the more stable $Ni^{3+}$ or $Ni^{2+}$, $Ni^{4+}$ triggers severe electrolyte decomposition at the electrode/electrolyte interface, leading to the reduction of $Ni^{4+}$ and the oxidative decomposition of the electrolytes. Electrolyte decomposition at the electrolyte/electrode interface causes the accumulation of decomposed adducts on the NCM cathode surface. This hinders Li+ migration between the electrolyte and electrode, which in turn results in the rapid fading of the cycling performance. Thus the practical integration of a silicon anode in Li-ion batteries faces challenges such as large volume changes, unstable solid-electrolyte interphase, electrolyte drying out, etc.

As discussed above, typical electrodes include a current collector such as a copper sheet. Carbon is deposited onto the collector along with an inactive binder material. Carbon is often used because it has excellent electrochemical properties and is also electrically conductive. If the current collector layer (e.g., copper layer) was removed, the carbon would likely be unable to mechanically support itself. Therefore, conventional electrodes require a support structure such as the collector to be able to function as an electrode. The electrode (e.g., anode or cathode) compositions described in this application can produce self-supported electrodes. The need for a metal foil current collector is eliminated or minimized because the conductive carbonized polymer is used for current collection in the anode structure as well as for mechanical support. In typical applications for the mobile industry, a metal current collector is typically added to ensure sufficient rate performance. The carbonized polymer can form a substantially continuous conductive carbon phase in the entire electrode as opposed to particulate carbon suspended in a non-conductive binder in one class of conventional lithium-ion battery electrodes. Advantages of a carbon composite blend that utilizes a carbonized polymer can include, for example, 1) higher capacity, 2) enhanced overcharge/discharge protection, 3) lower irreversible capacity due to the elimination (or minimization) of metal foil current collectors, and 4) potential cost savings due to simpler manufacturing.

In order to increase the volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, have also been reported as viable candidates as active materials for the negative or positive electrodes. Small particle sizes (for example, sizes in the nanometer range) generally can increase cycle life performance. They also can display very high initial irreversible capacity. However, small particle sizes also can result in very low volumetric energy density (for example, for the overall cell stack) due to the difficulty of packing the active material. Larger particle sizes, (for example, sizes in the micron range) generally can result in higher density anode material. However, the expansion of the silicon active material can result in poor cycle life due to particle cracking. For example, silicon can swell over 300% upon lithium insertion. Because of this expansion, anodes including silicon should be allowed to expand while maintaining electrical contact between the silicon particles. The use of aqueous-based polymers as a primary component in a multi-component binder composition (that also contains an water insoluble polymer) as disclosed herein for Si anodes may allow for free spaces to be created among Si particles during the pyrolysis process. These free spaces may allow for the necessary expansion, creating the extra volume required for Si expansion during cycling.

Cathode electrodes (positive electrodes) described herein may include metal oxide cathode materials, such as Lithium Cobalt Oxide ($LiCoO_2$) (LCO), Ni-rich oxides, high voltage cathode materials, lithium-rich oxides, nickel-rich layered oxides, lithium-rich layered oxides, high-voltage spinel oxides, and high-voltage polyanionic compounds. Ni-rich oxides and/or high voltage cathode materials may include NCM and NCA. Example of NCM materials include, but are not limited to, $LiNi_{0.6}Co_{0.2}Mn_{0.2}O_2$ (NCM-622) and $LiNi_{0.8}Co_{0.1}Mn_{0.1}O_2$ (NCM-811). Lithium-rich oxides may include $xLi_2Mn_3O_2.(1-x)LiNi_aCo_bMn_cO_2$. Nickel-rich layered oxides may include $LiNi_{1+x}M_{1-x}O_z$ (where M=Co, Mn or Al). Lithium-rich layered oxides may include $LiNi_{1+x}M_{1-x}O_2$ (where M=Co, Mn or Ni). High-voltage spinel oxides may include $LiNi_{0.5}Mn_{1.5}O_4$. High-voltage polyanionic compounds may include phosphates, sulfates, silicates, etc.

In certain embodiments, the positive electrode may be one of NCA, NCM, LMO or LCO. The NCM cathodes include NCM 9 0.5 0.5, NCM811, NCM622, NCM532, NCM433, NCM111, and others. In further embodiments, the positive electrode comprises a lithium-rich layered oxide $xLi_2MnO_3.(1-x)LiNi_aCo_bMn_cO_2$; nickel-rich layered oxide $LiNi_{1-x}M_xO_2$ (M=Co, Mn and Al); or lithium rich layered oxide $LiNi_{1+x}M_{1-x}O_2$ (M=Co, Mn and Ni) cathode.

As described herein and in U.S. patent application Ser. Nos. 13/008,800 and 13/601,976, entitled "Composite Materials for Electrochemical Storage" and "Silicon Particles for Battery Electrodes," respectively, certain embodiments utilize a method of creating monolithic, self-supported anodes using a carbonized polymer. Because the polymer is converted into an electrically conductive and electrochemically active matrix, the resulting electrode is conductive enough that, in some embodiments, a metal foil or mesh current collector can be omitted or minimized. The converted polymer also acts as an expansion buffer for silicon particles during cycling so that a high cycle life can be achieved. In certain embodiments, the resulting electrode is an electrode that is comprised substantially of active material. In further embodiments, the resulting electrode is substantially active material. The electrodes can have a high energy density of between about 500 mAh/g to about 1200 mAh/g that can be due to, for example, (1) the use of silicon, (2) elimination or substantial reduction of metal current collectors, and (3) being comprised entirely or substantially entirely of active material.

As described herein and in U.S. patent application Ser. No. 14/800,380, entitled "Electrolyte Compositions for Batteries," the entirety of which is hereby incorporated by reference, composite materials can be used as an anode in most conventional Li-ion batteries; they may also be used as the cathode in some electrochemical couples with additional additives. The composite materials can also be used in either secondary batteries (e.g., rechargeable) or primary batteries (e.g., non-rechargeable). In some embodiments, the composite materials can be used in batteries implemented as a pouch cell, as described in further details herein. In certain embodiments, the composite materials are self-supported structures. In further embodiments, the composite materials are self-supported monolithic structures. For example, a collector may be included in the electrode comprised of the composite material. In certain embodiments, the composite material can be used to form carbon structures discussed in U.S. patent application Ser. No. 12/838,368 entitled "Carbon Electrode Structures for Batteries," the entirety of which is hereby incorporated by reference. Furthermore, the composite materials described herein can be, for example, silicon composite materials, carbon composite materials, and/or silicon-carbon composite materials.

In some embodiments, the largest dimension of the silicon particles can be less than about 40 µm, less than about 1 µm, between about 10 nm and about 40 µm, between about 10 nm and about 1 µm, less than about 500 nm, less than about 100 nm, and about 100 nm. All, substantially all, or at least some of the silicon particles may comprise the largest dimension described above. For example, an average or median largest dimension of the silicon particles can be less than about 40 µm, less than about 1 µm, between about 10 nm and about 40 µm, between about 10 nm and about 1 µm, less than about 500 nm, less than about 100 nm, and about 100 nm. The amount of silicon in the composite material can be greater than zero percent by weight of the mixture and composite material. In certain embodiments, the mixture comprises an amount of silicon, the amount being within a range of from about 0% to about 95% by weight, including from about 30% to about 95% by weight of the mixture. The amount of silicon in the composite material can be within a range of from about 0% to about 35% by weight, including from about 0% to about 25% by weight, from about 10% to about 35% by weight, and about 20% by weight. In further certain embodiments, the amount of silicon in the mixture is at least about 30% by weight; greater than 0% and less than about 95% by weight; or between about 50% and about 95% by weight. Additional embodiments of the amount of silicon in the composite material include more than about 50% by weight, between about 30% and about 95% by weight, between about 50% and about 85% by weight, and between about 75% and about 95% by weight. Furthermore, the silicon particles may or may not be pure silicon. For example, the silicon particles may be substantially silicon or may be a silicon alloy. In one embodiment, the silicon alloy includes silicon as the primary constituent along with one or more other elements.

As described herein, micron-sized silicon particles can provide good volumetric and gravimetric energy density combined with good cycle life. In certain embodiments, to obtain the benefits of both micron-sized silicon particles (e.g., high energy density) and nanometer-sized silicon particles (e.g., good cycle behavior), silicon particles can have an average particle size in the micron range and a surface including nanometer-sized features. In some embodiments, the silicon particles have an average particle size (e.g., average diameter or average largest dimension) between about 0.1 µm and about 30 µm or between about 0.1 µm and all values up to about 30 µm. For example, the silicon particles can have an average particle size between about 0.5 µm and about 25 µm, between about 0.5 µm and about 20 µm, between about 0.5 µm and about 15 µm, between about 0.5 µm and about 10 µm, between about 0.5 µm and about 5 µm, between about 0.5 µm and about 2 µm, between about 1 µm and about 20 µm, between about 1 µm and about 15 µm, between about 1 µm and about 10 µm, between about 5 µm and about 20 µm, etc. Thus, the average particle size can be any value between about 0.1 µm and about 30 µm, e.g., 0.1 µm, 0.5 µm, 1 µm, 5 µm, 10 µm, 15 µm, 20 µm, 25 µm, and 30 µm.

The composite material of the electrode can be formed by pyrolyzing a polymer precursor. The amount of carbon obtained from the precursor can be about 50 weight percent by weight of the composite material. In certain embodiments, the amount of carbon from the precursor in the composite material is about 10% to about 25% by weight. The carbon from the precursor can be hard carbon. Hard carbon can be a carbon that does not convert into graphite even with heating over 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are cross-linked. A soft carbon precursor can be used if it does not melt at the heat treatment temperatures used. In some embodiments, the amount of carbon in the composite material has a value within a range of from about 10% to about 25% by weight, about 20% by weight, or more than about 50% by weight. In some embodiments, there may be greater than 0% and less than about 90% by weight of one or more types of carbon phases. In certain embodiments, the carbon phase is substantially amorphous. In other embodiments, the carbon phase is substantially crystalline. In further embodiments, the carbon phase includes amorphous and crystalline carbon. The carbon phase can be a matrix phase in the composite material. The carbon can also be embedded in the pores of the additives including silicon. The carbon may react with some of the additives to create some materials at interfaces. For example, there may be a silicon carbide layer between the silicon particles and the carbon.

In certain embodiments, graphite particles are added to the mixture. Advantageously, graphite can be an electrochemically active material in the battery as well as an elastically deformable material that can respond to the volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, the largest dimension of the graphite particles is between about 0.5 microns and about 20 microns. All, substantially all, or at least some of the graphite particles may comprise the largest dimension described herein. In further embodiments, an average or median largest dimension of the graphite particles is between about 0.5 microns and about 20 microns. In certain embodiments, the mixture includes greater than 0% and less than about 80% by weight of graphite particles. In further embodiments, the composite material includes about 1% to about 20% by weight graphite particles. In further embodiments, the composite material includes about 40% to about 75% by weight graphite particles.

In certain embodiments, conductive particles which may also be electrochemically active are added to the mixture. Such particles can enable both a more electronically conductive composite as well as a more mechanically deformable composite capable of absorbing the large volumetric change incurred during lithiation and de-lithiation. In certain embodiments, a largest dimension of the conductive particles is between about 10 nanometers and about 7 millimeters. All, substantially all, or at least some of the conductive particles may comprise the largest dimension described herein. In further embodiments, an average or median largest dimension of the conductive particles is between about 10 nm and about 7 millimeters. In certain embodiments, the mixture includes greater than zero and up to about 80% by weight conductive particles. In further embodiments, the composite material includes about 45% to about 80% by weight conductive particles. The conductive particles can be conductive carbon including carbon blacks, carbon fibers, carbon nanofibers, carbon nanotubes, graphite, graphene, etc. Many carbons that are considered as conductive additives that are not electrochemically active become active once pyrolyzed in a polymer matrix. Alternatively, the conductive particles can be metals or alloys including copper, nickel, or stainless steel.

The composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In some embodiments, the full capacity of the composite material may not be utilized during the use of the battery in order to improve battery life (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 2000 mAh/g, while the composite material may only be used up to a gravimetric capacity of about 550 to about 850 mAh/g. Although, the maximum gravimetric capacity of the composite material may not be utilized, using the composite material at a lower capacity can still achieve a higher capacity than certain lithium-ion batteries. In certain embodiments, the composite material is used or only used at a gravimetric capacity below about 70% of the composite material's maximum gravimetric capacity. For example, the composite material is not used at a gravimetric capacity above about 70% of the composite material's maximum gravimetric capacity. In further embodiments, the composite material is used or only used at a gravimetric capacity below about 60% of the composite material's maximum gravimetric capacity or below about 50% of the composite material's maximum gravimetric capacity.

An electrolyte composition for a lithium-ion battery can include a solvent and a lithium-ion source, such as a lithium-containing salt. The composition of the electrolyte may be selected to provide a lithium-ion battery with improved performance. In some embodiments, the electrolyte may contain an electrolyte additive. As described herein, a lithium-ion battery may include a first electrode, a second electrode, a separator between the first electrode and the second electrode, and an electrolyte in contact with the first electrode, the second electrode, and the separator. The electrolyte serves to facilitate ionic transport between the first electrode and the second electrode. In some embodiments, the first electrode and the second electrode can refer to anode and cathode or cathode and anode, respectively. Electrolytes and/or electrolyte compositions may be a liquid, solid, or gel.

In lithium-ion batteries, the most widely used electrolytes are non-aqueous liquid electrolytes; these may comprise a lithium-containing salt (e.g. $LiPF_6$) and low molecular weight carbonate solvents as well as various small amounts of functional additives. $LiPF_6$ holds a dominant position in commercial liquid electrolytes due to its well-balanced properties. However, $7LiPF_6$ has problems such as high reactivity towards moisture and poor thermal stability. These issues are primarily attributed to the equilibrium decomposition reaction of $LiPF_6$. The P—F bond in $LiPF_6$ and $PF_5$ is rather labile towards hydrolysis by inevitable trace amounts of moisture in batteries. Besides, as a strong Lewis acid, $PF_5$ is also able to initiate reactions with carbonate solvents and causes further electrolyte degradation. Moreover, a temperature rise further accelerates the decomposition reaction of $LiPF_6$ and consequently promotes subsequent parasitic reactions. This is also a reason for faster aging of current lithium-ion batteries at elevated temperatures, as compared to room temperature.

In some embodiments, the electrolyte for a lithium ion battery may include a solvent comprising a fluorine-containing component, such as a fluorine-containing cyclic carbonate, a fluorine-containing linear carbonate, and/or a fluoroether. In some embodiments, the electrolyte can include more than one solvent. For example, the electrolyte may include two or more co-solvents. In some embodiments, at least one of the co-solvents in the electrolyte is a fluorine-containing compound. In some embodiments, the fluorine-containing compound may be fluoroethylene carbonate (FEC), or difluoroethylene carbonate (F2EC). In some embodiments, the co-solvent may be selected from the group consisting of FEC, ethyl methyl carbonate (EMC), 1,1,2,2-tetrafluoroethyl 2,2,3,3-tetrafluoropropyl ether, difluoroethylene carbonate (F2EC), ethylene carbonate (EC), diethyl carbonate (DEC), dimethyl carbonate (DMC), propylene carbonate (PC), Dimethoxy ethane (DME), and gamma-butyrolactone (GBL), methyl acetate (MA), ethyl acetate (EA), and methyl propanoate. In some embodiments, the electrolyte contains FEC. In some embodiments, the electrolyte contains both EMC and FEC. In some embodiments, the electrolyte may further contain 1,1,2,2-tetrafluoroethyl 2,2,3,3-tetrafluoropropyl ether, EC, DEC, DMC, PC, GBL, and/or F2EC or some partially or fully fluorinated linear or cyclic carbonates, ethers, etc. as a co-solvent. In some embodiments, the electrolyte is free or substantially free of non-fluorine-containing cyclic carbonates, such as EC, GBL, and PC.

In further embodiments, electrolyte solvents may be composed of a cyclic carbonate, such as fluoro ethylene carbonate (FEC), di-fluoroethylene carbonate (DiFEC), Trifluoropropylene carbonate (TFPC), ethylene carbonate (EC), propylene carbonate (PC), etc; a linear carbonate, such as dimethyl carbonate (DMC), diethyl carbonate (DEC), ethyl methyl carbonate (EMC), etc, or other solvents, such as methyl acetate, ethyl acetate, or gamma butyrolactone, dimethoxyethane, 1,1,2,2-tetrafluoroethyl 2,2,3,3-tetrafluoropropyl ether, etc.

In some embodiments, the electrolyte composition may comprise a system of solvents (i.e. a solvent, plus one or more co-solvents). The solvents may be fluorinated or non-fluorinated. In some embodiments, the co-solvents may be one or more linear carbonates, lactones, acetates, propanoates and/or non-linear carbonates. In some embodiments, the co-solvents may be one or more carbonate solvents, such as one or more linear carbonates and/or non-linear carbonates, as discussed above. In some embodiments, an electrolyte composition may comprise one or more of EC at a concentration of 5% or more; FEC at a concentration of 5% or more; and/or TFPC at a concentration of 5% or more.

In some embodiments, the solvents in the electrolyte composition include, but are not limited to, one or more of ethyl methyl carbonate (EMC), methyl acetate, dimethyl carbonate (DMC), diethyl carbonate (DEC), gamma butyrolactone, methyl acetate (MA), ethyl acetate (EA), methyl propanoate, fluoro ethylene carbonate (FEC), di-fluoroethylene carbonate (DiFEC), Trifluoropropylene carbonate (TFPC), ethylene carbonate (EC), vinylene carbonate (VC) or propylene carbonate (PC). In further embodiments, the solvents include at least one of one or more of ethyl methyl carbonate (EMC), methyl acetate, dimethyl carbonate (DMC), diethyl carbonate (DEC), gamma butyrolactone, methyl acetate (MA), ethyl acetate (EA), methyl propanoate, along with at least one or more of fluoro ethylene carbonate (FEC), di-fluoroethylene carbonate (DiFEC), Trifluoropropylene carbonate (TFPC), ethylene carbonate (EC), vinylene carbonate (VC) or propylene carbonate (PC).

As used herein, a co-solvent of an electrolyte has a concentration of at least about 10% by volume (vol %). In some embodiments, a co-solvent of the electrolyte may be about 20 vol %, about 40 vol %, about 60 vol %, or about 80 vol %, or about 90 vol % of the electrolyte. In some embodiments, a co-solvent may have a concentration from about 10 vol % to about 90 vol %, from about 10 vol % to about 80 vol %, from about 10 vol % to about 60 vol %, from about 20 vol % to about 60 vol %, from about 20 vol % to about 50 vol %, from about 30 vol % to about 60 vol %, or from about 30 vol % to about 50 vol %.

For example, in some embodiments, the electrolyte may contain a fluorine-containing cyclic carbonate, such as FEC, at a concentration of about 10 vol % to about 60 vol %, including from about 20 vol % to about 50 vol %, and from about 20 vol % to about 40 vol %. In some embodiments, the electrolyte may comprise a linear carbonate that does not contain fluorine, such as EMC, at a concentration of about 40 vol % to about 90 vol %, including from about 50 vol % to about 80 vol %, and from about 60 vol % to about 80 vol %. In some embodiments, the electrolyte may comprise 1,1,2,2-tetrafluoroethyl 2,2,3,3-tetrafluoropropyl ether at a concentration of from about 10 vol % to about 30 vol %, including from about 10 vol % to about 20 vol %.

In some embodiments, the electrolyte is substantially free of cyclic carbonates other than fluorine-containing cyclic carbonates (i.e., non-fluorine-containing cyclic carbonates). Examples of non-fluorine-containing carbonates include EC, PC, GBL, and vinylene carbonate (VC).

In some embodiments, the electrolyte may further comprise one or more additives. As used herein, an additive of the electrolyte refers to a component that makes up less than 10% by weight (wt %) of the electrolyte. In some embodiments, the amount of each additive in the electrolyte may be from about 0.2 wt % to about 1 wt %, 0.1 wt % to about 2 wt %, 0.2 wt % to about 9 wt %, from about 0.5 wt % to about 9 wt %, from about 1 wt % to about 9 wt %, from about 1 wt % to about 8 wt %, from about 1 wt % to about 8 wt %, from about 1 wt % to about 7 wt %, from about 1 wt % to about 6 wt %, from about 1 wt % to about 5 wt %, from about 2 wt % to about 5 wt %, or any value in between. In some embodiments, the total amount of the additive(s) may be from about 1 wt % to about 9 wt %, from about 1 wt % to about 8 wt %, from about 1 wt % to about 7 wt %, from about 2 wt % to about 7 wt %, or any value in between. In other embodiments, the percentages of additives may be expressed in volume percent (vol %).

In some embodiments, salts may be included in the electrolyte compositions. A lithium-containing salt for a lithium-ion battery may comprise a fluorinated or non-fluorinated salt. In further embodiments, a lithium-containing salt for a lithium-ion battery may comprise one or more of lithium hexafluorophosphate ($LiPF_6$), lithium tetrafluoroborate ($LiBF_4$), lithium hexafluoroarsenate monohydrate ($LiAsF_6$), lithium perchlorate ($LiClO_4$), lithium bis(trifluoromethanesulfonyl)imide (LiTFSI), lithium bis(fluorosulfonyl)imide (LiFSI), lithium bis(oxalato)borate (LiBOB), lithium difluoro(oxalate)borate (LiDFOB), lithium triflate ($LiCF_3SO_3$), lithium tetrafluorooxalato phosphate (LTFOP), lithium difluorophosphate ($LiPO_2F_2$), lithium pentafluoroethyltrifluoroborate (LiFAB), and lithium 2-trifluoromethyl-4,5-dicyanoimidazole (LiTDI), lithium bis(2-fluoromalonato)borate (LiBFMB), lithium 4-pyridyl trimethyl borate (LPTB), lithium 2-fluorophenol trimethyl borate (LFPTB), lithium catechol dimethyl borate (LiCDMB), lithium tetrafluorooxalatophosphate (LiFOP), etc. or combinations thereof. In certain embodiments, a lithium-containing salt for a lithium-ion battery may comprise lithium hexafluorophosphate ($LiPF_6$). In some embodiments, the electrolyte can have a salt concentration of about 1 moles/L (M). In other embodiments, the salt concentration can be higher than 1 M; in further embodiments, the salt concentration can be higher than 1.2 M.

The term "alkyl" refers to a straight or branched, saturated, aliphatic radical having the number of carbon atoms indicated. The alkyl moiety may be branched or straight chain. For example, C1-C6 alkyl includes, but is not limited to, methyl, ethyl, propyl, isopropyl, butyl, isobutyl, sec-butyl, tert-butyl, pentyl, isopentyl, hexyl, etc. Other alkyl groups include, but are not limited to heptyl, octyl, nonyl, decyl, etc. Alkyl can include any number of carbons, such as 1-2, 1-3, 1-4, 1-5, 1-6, 1-7, 1-8, 1-9, 1-10, 1-11, 1-12 2-3, 2-4, 2-5, 2-6, 3-4, 3-5, 3-6, 4-5, 4-6 and 5-6. The alkyl group is typically monovalent, but can be divalent, such as when the alkyl group links two moieties together.

The term "fluoro-alkyl" refers to an alkyl group where one, some, or all hydrogen atoms have been replaced by fluorine.

The term "alkylene" refers to an alkyl group, as defined above, linking at least two other groups, i.e., a divalent hydrocarbon radical. The two moieties linked to the alkylene can be linked to the same atom or different atoms of the alkylene. For instance, a straight chain alkylene can be the bivalent radical of —$(CH_2)_n$—, where n is 1, 2, 3, 4, 5, 6, 7, 8, 9, or 10. Alkylene groups include, but are not limited to, methylene, ethylene, propylene, isopropylene, butylene, isobutylene, sec-butylene, pentylene and hexylene.

The term "alkoxy" refers to alkyl group having an oxygen atom that either connects the alkoxy group to the point of attachment or is linked to two carbons of the alkoxy group. Alkoxy groups include, for example, methoxy, ethoxy, propoxy, iso-propoxy, butoxy, 2-butoxy, iso-butoxy, sec-butoxy, tert-butoxy, pentoxy, hexoxy, etc. The alkoxy groups can be further substituted with a variety of substituents described within. For example, the alkoxy groups can be substituted with halogens to form a "halo-alkoxy" group, or substituted with fluorine to form a "fluoro-alkoxy" group.

The term "alkenyl" refers to either a straight chain or branched hydrocarbon of 2 to 6 carbon atoms, having at least one double bond. Examples of alkenyl groups include, but are not limited to, vinyl, propenyl, isopropenyl, 1-butenyl, 2-butenyl, isobutenyl, butadienyl, 1-pentenyl, 2-pentenyl, isopentenyl, 1,3-pentadienyl, 1,4-pentadienyl, 1-hexenyl, 2-hexenyl, 3-hexenyl, 1,3-hexadienyl, 1,4-hexadienyl, 1,5-hexadienyl, 2,4-hexadienyl, or 1,3,5-hexatrienyl. Alkenyl groups can also have from 2 to 3, 2 to 4, 2 to 5, 3 to 4, 3 to 5, 3 to 6, 4 to 5, 4 to 6 and 5 to 6 carbons. The alkenyl group is typically monovalent, but can be divalent, such as when the alkenyl group links two moieties together.

The term "alkenylene" refers to an alkenyl group, as defined above, linking at least two other groups, i.e., a divalent hydrocarbon radical. The two moieties linked to the alkenylene can be linked to the same atom or different atoms of the alkenylene. Alkenylene groups include, but are not limited to, ethenylene, propenylene, isopropenylene, butenylene, isobutenylene, sec-butenylene, pentenylene and hexenylene.

The term "alkynyl" refers to either a straight chain or branched hydrocarbon of 2 to 6 carbon atoms, having at least one triple bond. Examples of alkynyl groups include, but are not limited to, acetylenyl, propynyl, 1-butynyl, 2-butynyl, isobutynyl, sec-butynyl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5-hexadiynyl, 2,4-hexadiynyl, or 1,3,5-hexatriynyl. Alkynyl groups can also have from 2 to 3, 2 to 4, 2 to 5, 3 to 4, 3 to 5, 3 to 6, 4 to 5, 4 to 6 and 5 to 6 carbons. The alkynyl group is typically monovalent, but can be divalent, such as when the alkynyl group links two moieties together.

The term "alkynylene" refers to an alkynyl group, as defined above, linking at least two other groups, i.e., a divalent hydrocarbon radical. The two moieties linked to the alkynylene can be linked to the same atom or different atoms of the alkynylene. Alkynylene groups include, but are not limited to, ethynylene, propynylene, butynylene, sec-butynylene, pentynylene, and hexynylene.

The term "cycloalkyl" refers to a saturated or partially unsaturated, monocyclic, fused bicyclic, bridged polycyclic, or spiro ring assembly containing from 3 to 12, from 3 to 10, or from 3 to 7 ring atoms, or the number of atoms indicated. Monocyclic rings include, for example, cyclopropyl, cyclobutyl, cyclopentyl, cyclohexyl, and cyclooctyl. Bicyclic and polycyclic rings include, for example, norbornane, decahydronaphthalene and adamantane. For example, C3-C8 cycloalkyl includes cyclopropyl, cyclobutyl, cyclopentyl, cyclohexyl, cyclooctyl, and norbornane. As used herein, the term "fused" refers to two rings which have two atoms and one bond in common. For example, in the following structure, rings A and B are fused

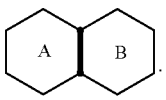

As used herein, the term "bridged polycyclic" refers to compounds wherein the cycloalkyl contains a linkage of one or more atoms connecting non-adjacent atoms. The following structures

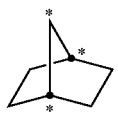

and

are examples of "bridged" rings. As used herein, the term "spiro" refers to two rings that have one atom in common and the two rings are not linked by a bridge. Examples of fused cycloalkyl groups are decahydronaphthalenyl, dodecahydro-1H-phenalenyl and tetradecahydroanthracenyl; examples of bridged cycloalkyl groups are bicyclo[1.1.1]pentyl, adamantanyl, and norbornanyl; and examples of spiro cycloalkyl groups include spiro[3.3]heptane and spiro[4.5]decane.

The term "cycloalkylene" refers to a cycloalkyl group, as defined above, linking at least two other groups, i.e., a divalent hydrocarbon radical. The two moieties linked to the cycloalkylene can be linked to the same atom or different atoms of the cycloalkylene. Cycloalkylene groups include, but are not limited to, cyclopropylene, cyclobutylene, cyclopentylene, cyclohexylene, and cyclooctylene.

The term "aryl" refers to a monocyclic or fused bicyclic, tricyclic or greater, aromatic ring assembly containing 6 to 16 ring carbon atoms. For example, aryl may be phenyl, benzyl or naphthyl, preferably phenyl. Aryl groups may include fused multicyclic ring assemblies wherein only one ring in the multicyclic ring assembly is aromatic. Aryl groups can be mono-, di-, or tri-substituted by one, two or three radicals. Preferred as aryl is naphthyl, phenyl, or phenyl mono- or disubstituted by alkoxy, phenyl, halogen, alkyl or trifluoromethyl, especially phenyl or phenyl-mono- or disubstituted by alkoxy, halogen or trifluoromethyl, and in particular phenyl.

The term "arylene" refers to an aryl group, as defined above, linking at least two other groups. The two moieties linked to the arylene are linked to different atoms of the arylene. Arylene groups include, but are not limited to, phenylene.

The term "heteroaryl" refers to a monocyclic or fused bicyclic or tricyclic aromatic ring assembly containing 5 to 16 ring atoms, where from 1 to 4 of the ring atoms are a heteroatom such as N, O, or S. For example, heteroaryl includes pyridyl, indolyl, indazolyl, quinoxalinyl, quinolinyl, isoquinolinyl, benzothienyl, benzofuranyl, furanyl, pyrrolyl, thiazolyl, benzothiazolyl, oxazolyl, isoxazolyl, triazolyl, tetrazolyl, pyrazolyl, imidazolyl, thienyl, or any other radicals substituted, especially mono- or di-substituted, by e.g. alkyl, nitro or halogen. Pyridyl represents 2-, 3- or 4-pyridyl, advantageously 2- or 3-pyridyl. Thienyl represents 2- or 3-thienyl. Quinolinyl represents preferably 2-, 3- or 4-quinolinyl. Isoquinolinyl represents preferably 1-, 3- or 4-isoquinolinyl. Benzopyranyl, benzothiopyranyl represents preferably 3-benzopyranyl or 3-benzothiopyranyl, respectively. Thiazolyl represents preferably 2- or 4-thiazolyl, and most preferred 4-thiazolyl. Triazolyl is preferably 1-, 2- or 5-(1,2,4-triazolyl). Tetrazolyl is preferably 5-tetrazolyl.

Preferably, heteroaryl is pyridyl, indolyl, quinolinyl, pyrrolyl, thiazolyl, isoxazolyl, triazolyl, tetrazolyl, pyrazolyl, imidazolyl, thienyl, furanyl, benzothiazolyl, benzofuranyl, isoquinolinyl, benzothienyl, oxazolyl, indazolyl, or any of the radicals substituted, especially mono- or di-substituted.

The term "heteroalkyl" refers to an alkyl group having from 1 to 3 heteroatoms such as N, O and S. The heteroatoms can also be oxidized, such as, but not limited to, —S(O)— and —S(O)$_2$—. For example, heteroalkyl can include ethers, thioethers, alkyl-amines and alkyl-thiols.

The term "heteroalkylene" refers to a heteroalkyl group, as defined above, linking at least two other groups. The two moieties linked to the heteroalkylene can be linked to the same atom or different atoms of the heteroalkylene.

The term "heterocycloalkyl" refers to a ring system having from 3 ring members to about 20 ring members and from 1 to about 5 heteroatoms such as N, O and S. The heteroatoms can also be oxidized, such as, but not limited to, —S(O)— and —S(O)$_2$—. For example, heterocycle includes, but is not limited to, tetrahydrofuranyl, tetrahydrothiophenyl, morpholino, pyrrolidinyl, pyrrolinyl, imidazolidinyl, imidazolinyl, pyrazolidinyl, pyrazolinyl, piperazinyl, piperidinyl, indolinyl, quinuclidinyl and 1,4-dioxa-8-aza-spiro[4.5]dec-8-yl.

The term "heterocycloalkylene" refers to a heterocyclalkyl group, as defined above, linking at least two other groups. The two moieties linked to the heterocycloalkylene can be linked to the same atom or different atoms of the heterocycloalkylene.

The term "optionally substituted" is used herein to indicate a moiety that can be unsubstituted or substituted by one or more substituent. When a moiety term is used without specifically indicating as substituted, the moiety is unsubstituted.

Among the recent advancements in silicon-based anode development, one is the direct coated anode using organic solvent-based binders (polymers and/or resins) followed by heat treatment to convert the binder into a carbon matrix. However, use of binders that require organic solvents as the dissolver is problematic, as discussed above. In the present disclosure a direct coated anode using a water soluble (aqueous-based) polymer as part of a multi-component binder composition that also contains an water insoluble polymer followed by heat treatment to convert the binder to carbon matrix is disclosed. The present disclosure addresses the following key advancements: (1) use of environmentally friendly solvent (water) to allow safer, cheaper and faster processing and scalability; (2) Si dominant anodes with high Si content (>70 wt. %) for high capacity; and (3) the development of Si dominant anodes free of non-conducting binders capable of fast charging (>2C), i.e. anodes that contain only carbon and silicon. Although solvent-based anodes have had some effectiveness in improving cycle performance, these anodes may have weak adhesion to the current collector and contain non-continued carbon media that leads to unacceptable performance. Also, although the introduction of carbon additives can somewhat improve the conductivity of the anode, the existence of carbon additives may weaken the adhesion of anode materials to the current collector. Thus, the binder plays an important role in improving the performance of silicon anodes.

In the present disclosure, water-soluble (aqueous-based) polymers and methods of making anodes including such polymers are disclosed, where the water-soluble (aqueous-based) polymer is part of a multi-component binder composition that also contains an water insoluble polymer. Specifically, a secondary water-insoluble polymeric component is added to a primary water-soluble primary polymer solution to create an aqueous-based suspension-solution binder composition for use in creating aqueous-based anodes.

In one embodiment, an insoluble polymer powder is dispersed in flowable polymer matrix to be used as a binder for Si dominant anode. The polymer powder may be used to prepare an aqueous binder solution which helps in uniform dispersion of active materials and other insoluble polymers. The polymer suspensions disclosed herein show satisfactory suspension-solution dispersion and may be processed to produce robust pyrolyzed anodes or may be used without pyrolyzation. In one embodiment, the flowable polymer matrix is an aqueous solution of a polymer. In other solutions, the flowable polymer matrix is a molten polymer.

Coin cells may be prepared for investigation, using Si anodes with suspension-solution aqueous binder composition. Also, SEM analysis of may assist in understanding the morphology of as prepared anodes and pyrolyzed anodes.

In one embodiment, the aqueous-based suspension-solution binder composition may be created utilizing PAA/CMC as the water-soluble primary polymer solution, with polyimide (PI) powder as the secondary water-insoluble polymeric component. In another embodiment, PAN may be used as the solid suspension within a water-soluble primary polymer solution. In a further embodiment, P84 polyimide powder (325 mesh) may be used to prepare solid suspensions in water-soluble primary polymer solutions. In these experiments, fine dispersible particles of insoluble polymer may be present within the water-soluble primary polymer solution.

In further embodiments, other polymers may be used as the water soluble primary polymer, such as poly(methyl vinyl ether-alt-maleic anhydride) (PMVMA).

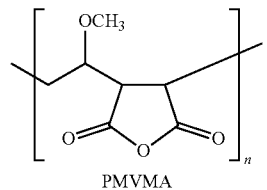

PMVMA

When PMVMA is used as the primary component in an aqueous-based suspension-solution binder composition, the secondary (insoluble component) may be a thermoplastic polyetherimide (PEI) powder blend, a polyacrylonitrile (PAN) powder blends or other polymer powder blends, with water as the solvent.

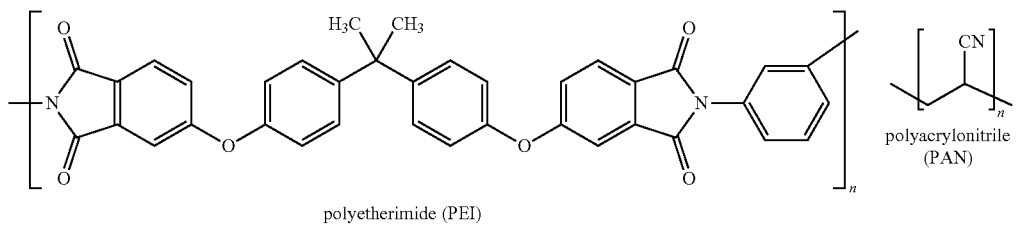

polyetherimide (PEI)

polyacrylonitrile (PAN)

In some embodiments, different molecular weights and degree of polymerization of PMVMA may be utilized.

PMVMA contains carboxylic acid groups and utilizing this polymer in the as the water-soluble primary polymer solution (solution phase) of the aqueous-based suspension-solution binder compositions can improve the adhesion of anode materials on to the Cu surface. The presence of organic acid groups may initiate the surface treatment/roughening of the Cu current collector. Additionally, these functional groups further improve the particle to particle interactions, required to retain the electrode structure. Other polymers having reactive groups include, but are not limited to water-based phenols. Further examples include, but are not limited to Poly(methyl vinyl ether-alt-maleic acid); Poly(methyl vinyl ether-alt-maleic acid monoethyl ester); and Polyethylene-graft-maleic anhydride.

In some aspects, energy storage devices such as batteries are provided where the electrodes are made utilizing the binder compositions. In some embodiments, the energy storage device includes a first electrode and a second electrode, wherein at least one of the first electrode and the second electrode is a Si-based electrode. In some embodiments, the energy storage device includes a separator between the first electrode and the second electrode. In some embodiments, the energy storage device includes an electrolyte, which may be provided as an electrolyte composition.

In some embodiments, the second electrode is a Si-dominant electrode. In some embodiments, the second electrode comprises a self-supporting composite material film. In some embodiments, the composite material film comprises greater than 0% and less than about 95% by weight of silicon particles, and greater than 0% and less than about 90% by weight of one or more types of carbon phases, wherein at least one of the one or more types of carbon phases is a substantially continuous phase that holds the composite material film together such that the silicon particles are distributed throughout the composite material film.

In some embodiments, the battery may be capable of at least 200 cycles with more than 80% cycle retention when cycling with a C-rate of >2C cycling between an upper voltage of >4V and a lower cut-off voltage of <3.3V. In other embodiments, the battery may be capable of at least 200 cycles with more than 80% cycle retention when cycling with a C-rate of >2C cycling between an upper voltage of >4V and a lower cut-off voltage of <3.3V.

Example devices and processes for device fabrication are generally described below, and the performances of lithium-ion batteries with different electrode compositions may be evaluated. Properties of various aqueous-based suspension-solution binder compositions may be assessed.

In this example, PEI powder was mixed with Poly(methyl vinyl ether-alt-maleic anhydride) (PMVMA) (35.7 wt. % of PEI w.r.t. PMVMA). In this example 20 wt. % PMVMA solution may be used as the primary water-soluble polymer component (Table 1).

Table 1

Binder formula for PEI-PMVMA suspension-solution binder

|  | % solid of each component | Total Solid |
|---|---|---|
| PEI Powder | 4 | 1 | 4 |
| PMVMA (20 wt. % PMVMA in H2O) | 36 | 0.2 | 7.2 |

Figure 5:
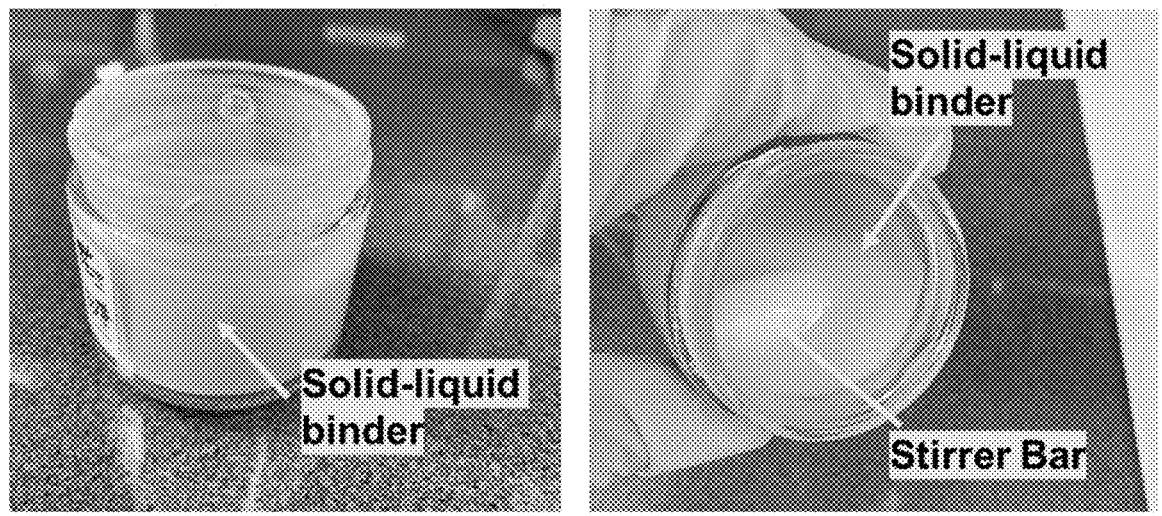
FIG. 5 shows an example solid (ULTEM™ 1000F3SP ultrafine PEI)-Liquid (PMVMA, 20 wt. % solution) binder for Si anodes, in accordance with an example embodiment of the disclosure.

The range of wt. % of PEI may be 0.1 to 50% of solids with respect to primary polymer solids and wt. % of PMVMA may be 10 to 40% of green solids with respect to total solid composition including active materials. When PMVMA (water soluble polymer) solution (20 wt. %) is mixed with PEI to prepare the suspension-solution aqueous based binder, the PEI solid particles may be homogeneously dispersed within the polymer matrix without settling. The homogeneity of the suspension-solution aqueous binder mainly depends on the particle size of the secondary water insoluble polymer (PEI). In this example, ULTEM™ 1000F3SP ultrafine PEI was dispersed in PMVMA (FIG. 5).

In another example, solid PI fine particles may be dispersed in an aqueous PAA polymer solution. In this example PI is the water insoluble polymer component and PAA is the primary water-soluble polymer component. PI powder was mixed with poly(acrylonitrile) (PAA). In this example 20 wt. % PAA solution may be used as the primary water-soluble polymer component (Table 2).

TABLE 2

Binder formula for PI-PAA suspension-solution binder

|  | PI (wt. %) in H$_2$O | PAA (wt. %) in H$_2$O | Total polymer % |
|---|---|---|---|
| PI-PAA (suspension-solution binder) | 15 | 15 | 30 |

Figure 6:
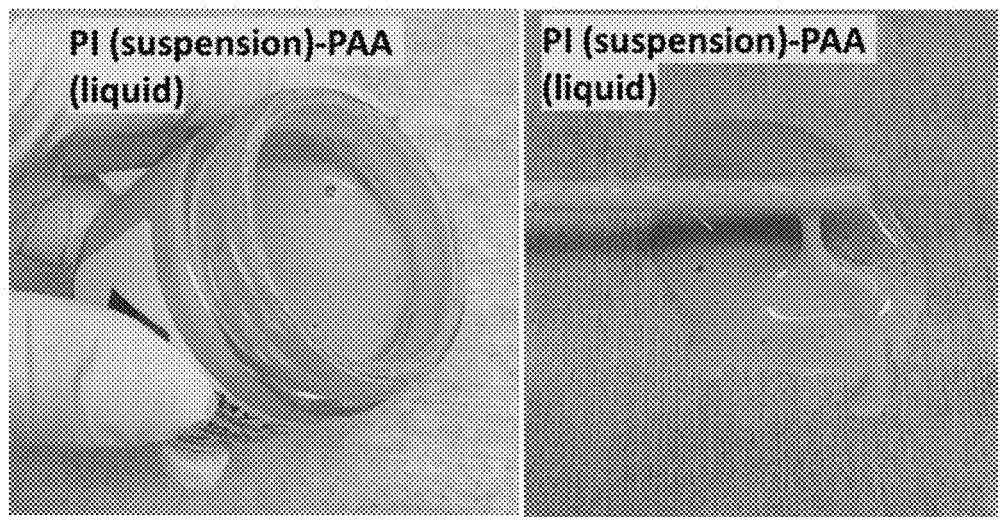
FIG. 6 shows an example solid (water insoluble PI polymer particle)-Liquid (PAA, 20 wt. % solution) binder for Si anodes, in accordance with an example embodiment of the disclosure.

The range of PI may be 0.1 to 50% of solids with respect to primary polymer solids by weight wt. % of PAA may be 10 to 40% of green solids with respect to total solid composition including active materials. Similar to PEI-PMVMA, a homogeneous suspension-solution binder composition was obtained upon mixing two components. These binders provide desirable viscosity to prepare Si anodes. The composition of the polymeric components can be adjusted to achieve optimum viscosity and char yield. FIG. 6 depicts the as prepared PI (solid)-PAA (liquid) binder composition.

In a further example, solid PAN fine particles were dispersed in PMVMA polymer solution. In this example PAN is the water insoluble polymer component and PMVMA is the is the primary water-soluble polymer component. PAN powder was mixed with PMVMA solution (20 wt. %). In this example 20 wt. % PMVMA solution was used as a liquid polymer component (Table-3).

TABLE 3

Binder formula for PAN-PMVMA suspension-solution binder

|  | % solid of each component | Total Solid |
|---|---|---|
| PAN Powder | 4 | 1 | 4 |
| PMVMA (20 wt. % PMVMA in H2O) | 36 | 0.2 | 7.2 |

Figure 7:
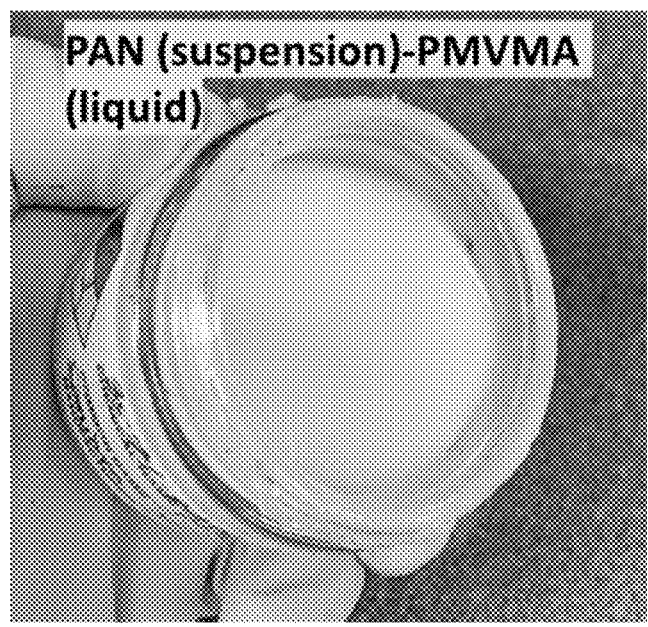
FIG. 7 shows an example solid (water insoluble PAN polymer particle)-Liquid (PMVMA, 20 wt. % solution) binder for Si anodes, in accordance with an example embodiment of the disclosure.

The range of PAN may be 0.1 to 50% of solids with respect to primary polymer solids and the wt. % of PMVMA may be 10 to 40% of green solids with respect to total solid composition including active materials. Similar to PEI-PMVMA, a homogeneous suspension-solution binder solution was obtained upon mixing two components. These binders provide desirable viscosity (1500-6000 cP that can be diluted if necessary) to coat Si anodes. The composition of the polymeric components can be adjusted to achieve optimum viscosity and char yield. FIG. 7 depicts the as prepared PAN (solid)-PMVMA (liquid) binder solution.

Figure 8:
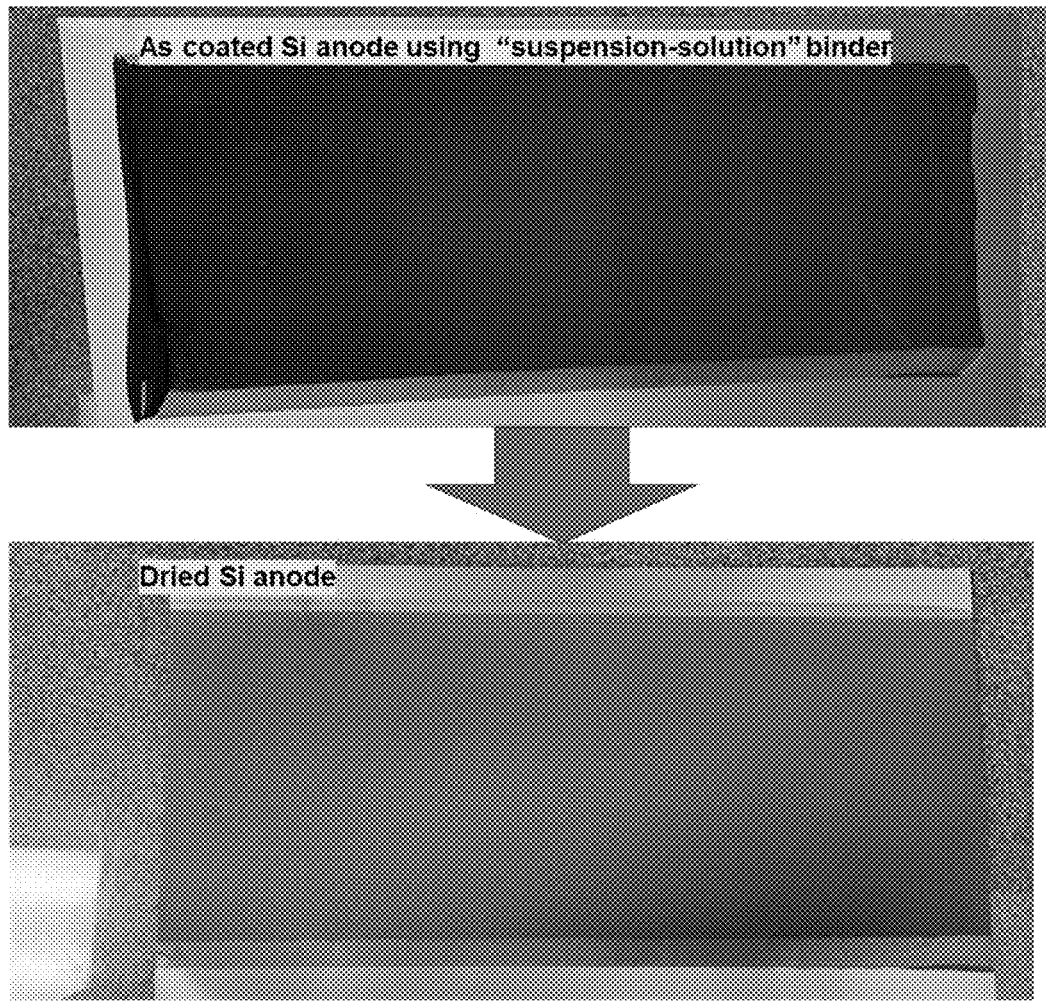
FIG. 8 shows an Si anode as coated with PEI-PMVMA binder composition (top) and after drying (bottom), in accordance with an example embodiment of the disclosure.

In all of the above examples, the slurry was formulated to obtain the post pyrolyzed anode composition of Si:Carbon (90:10 W/W). FIG. 8 shows coated and dried Si anode (green anode) that shows a uniform coating, which can be readily heat treated to yield Si—C composite anode. The green anode was heat treated/pyrolyzed at 650 deg C. under Argon atmosphere before fabricating Li ion cells. Specifically, FIG. 8 shows an Si anode as coated with PEI-PMVMA binder composition (top) and after drying (bottom).

Figure 9:
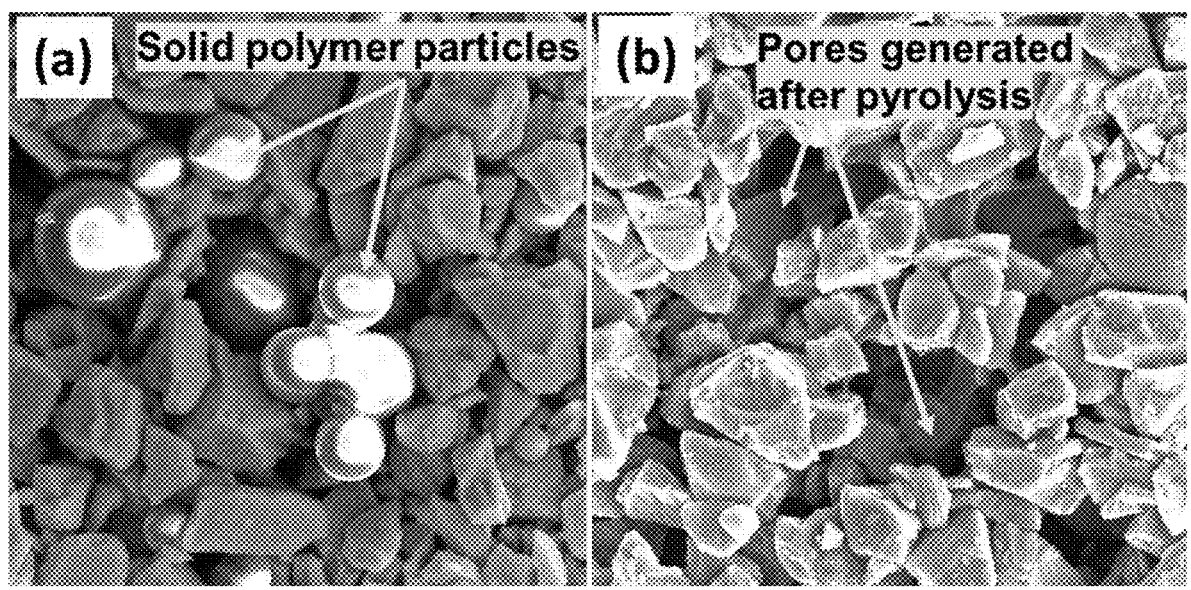
FIG. 9 shows an SEM image of an as coated Si anode (a) and pyrolyzed Si anode (b), in accordance with an example embodiment of the disclosure.

SEM images clearly show formation of pores as a result of the decomposition of solid polymer particles after pyrolyzation step (FIG. 9). While the decomposition of solid polymeric particles generates porosity in the anode, the water-soluble polymer media facilitates the retaining of the electrode structure. The presence of these pores can help to mitigate the anode expansion not only z direction but also x and y directions. The pyrolyzed Si anode showed pore structures across the Si anode.

Figure 10:
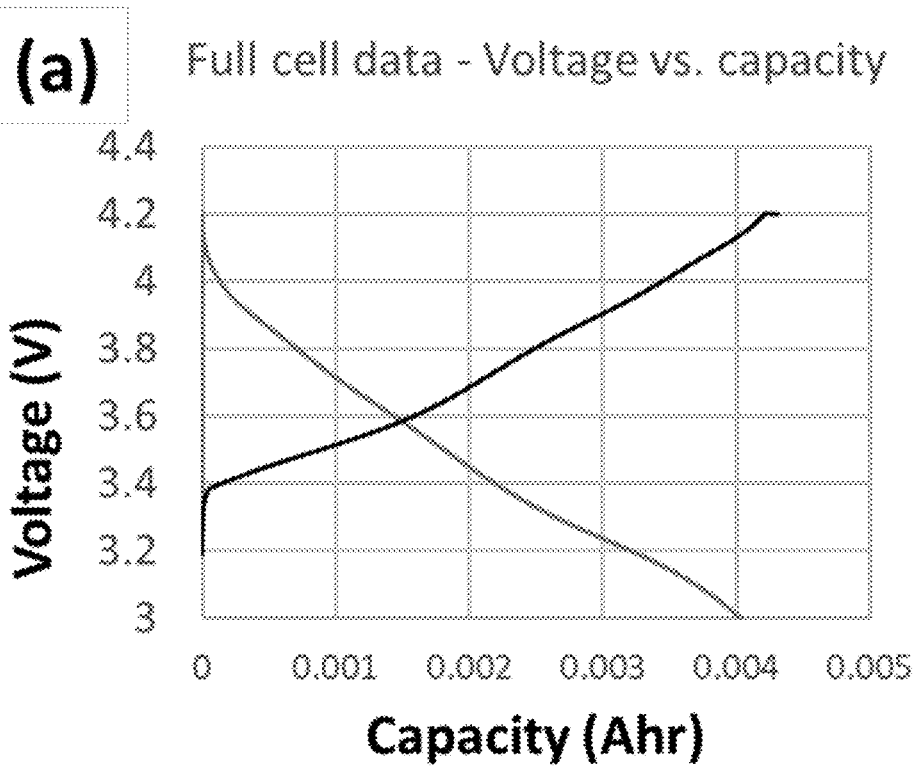
FIG. 10 shows voltage profiles for full cell (a) and half-cell (b) configuration of Si anodes prepared using a suspension-solution binder, in accordance with an example embodiment of the disclosure.
Figure 10:
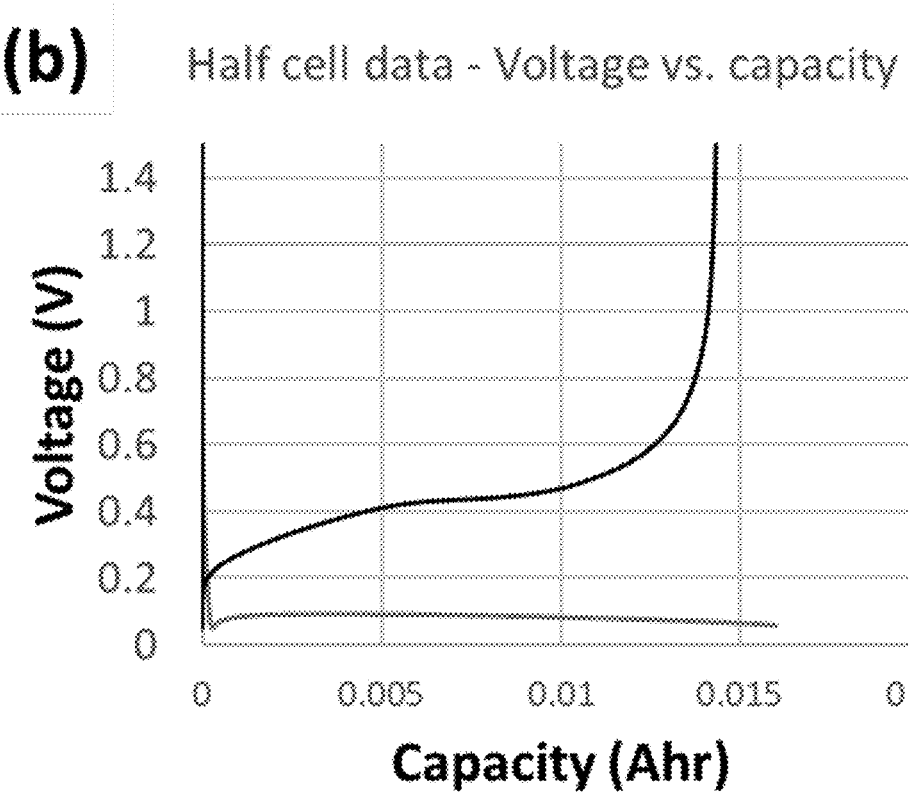

Si anodes prepared using the aqueous-based suspension-solution binder composition were analyzed both in half cell configuration and full cell configuration. FIG. 10 shows voltage curves for both full cell and half cell configurations. Si anodes against NCA cathode showed an initial coulombic efficiency (ICE) of 94.6% in full cell configuration. Half-cell configuration of Si anodes with Li metal foil showed ICE of 89.5%.

Figure 11:
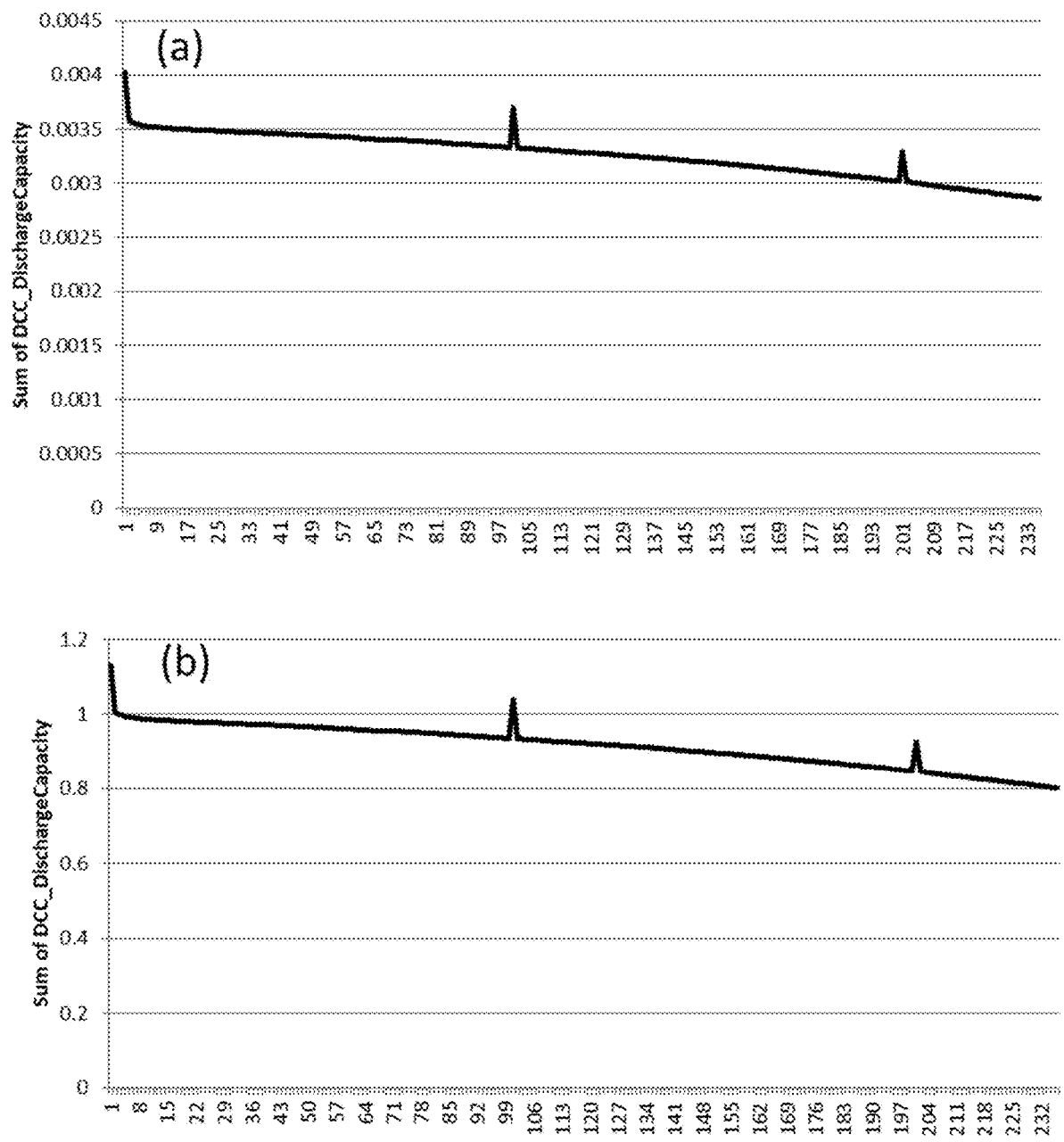
FIG. 11 shows the cycling discharge capacity retention of Si dominant anodes prepared using a suspension-solution (PEI-PMVMA) binder: capacity vs. cycle life (a) and normalized capacity vs. cycle life (b), in accordance with an example embodiment of the disclosure.

FIG. 11 shows the cycling performance of Si dominant anodes against NCA cathode. Li ion cells showed capacity retention of >80% over ~250 cycles. Specifically, FIG. 11 shows the cycling discharge capacity retention of Si dominant anodes prepared using a suspension-solution (PEI-PMVMA) binder: capacity vs. cycle life (a) and normalized capacity vs. cycle life (b). Cell configuration is Si anode/NCA cathode full cells.

The cycling performance and capacity of the anodes can be tailored by changing the composition of the anodes and/or pyrolyzation temperature. Without wishing to be bound by theory, it is believed that in the aqueous-based suspension-solution binder compositions disclosed herein, pyrolytic carbon that is generated from polymer components with aromatic structures are more favorable for high performance of the Si anodes.

The disclosed aqueous-based suspension-solution binder compositions have a "liquid phase" (water soluble polymer solution) and a "solid phase". Water-based polymers such as PAA, PVA, CMC, sucrose, starch, lignin, chitosan, and/or gums may be used as the "liquid phase" and PAN, PAI and PI with high char yield (such as 30-60% or 40-60% with respect to dried solids) polymers may be used as a "solid phase". Upon pyrolyzation at temperatures >200 deg C. these binder compositions generate a pyrolytic carbon matrix suitable for electrodes. The aqueous-based suspension-solution binder compositions may also be dried and used without pyrolyzation.

The aqueous-based suspension-solution binder compositions have a "liquid phase" (water soluble polymer solution) and a "solid phase" and are a mixture of one or more solids and one more liquids. In some embodiments, the solid-liquid solution has a combination of two or more insoluble polymers in water. Also, the solution mixture may be a combination two or more of water-soluble polymers wherein their mixture forms a non-soluble suspension in water. Mixing the solid polymer component and solution polymer component can be separated in time, for example, the polymeric powder can be added during the electrode slurry preparation, instead of in advance.

In some embodiments, water is the solvent and the aqueous-based suspension-solution binder composition may contain two or more immiscible polymer components.

The polymer components may comprise different functional groups such as —OH, NH—, $NH_2$, —COOH. These functional groups are decomposable at a relatively low temperature (below decomposition temperature of phenols). The presence of these functional groups facilitates the chemical interaction between solid and liquid polymers, and thus assists in creating a homogeneous polymer dispersion.

The presence of functional groups such as —COOH and $—NH_2$ in "liquid phase" (water soluble polymer solution) may promote cross linking with the functional groups of solid polymer component. Thus, in-situ crosslinking via thermal and/or photochemical crosslinking of polymers may occur in the presence of a second water-soluble polymer. The crosslinking reaction may be initiated in the presence of an inorganic salt or catalyst.

The polymer components and their derivatives, or combinations with different molecular weights, may be used for all different types of Si or SiOx anodes. The water soluble polymers, with or without the aforementioned crosslinking, their derivatives, and their combinations may be used for all different types of Si or SiOx anodes and may also be used, without pyrolysis, for electrode preparation.

The degree of the reaction between the "solid phase" (e.g. polymer particles) and the liquid phase" (water-soluble polymer solution) may be further controlled by heat treatment prior to mixing the binder with Si. Thus, the aqueous-based suspension-solution binder composition can be tailored to optimize the solubility/dispersibility as well as the viscosity of the binder.

The solid phase may comprise a nano-micro size solid polymer component with different morphologies i.e. particulate, beads, flakes, rods. The decomposition of the solid phase may create macro/mesopore structures within Si anode. These pores provide space for rapid volume changes of Si microparticles during cycling as well as for electrolyte soaking to improve ionic conductivity of the anodes.

The char yield of insoluble polymer component may be greater than 20% by wt. %, greater than 30 by wt. %, greater than 40 by wt. %, greater than 60 by wt. % or in the range of 5-95 by wt. %. Changing the char yield of the solid polymer component affects the overall porosity of the Si anode. Char yields are affected by many factors, including polymer structures and/or degradation pathways.

As an example, for PEI, thermogravimetric data show that the polymer leaves about 60% of charred residue at 800° C. The high char yield of PEI occurs because the main thermal degradation product is "bisphenol A" groups that form from breaking the isopropylidene bridge of bisphenol A groups. As the pyrolysis progresses around 620° C. the bisphenol groups turn into other phenol containing materials with high thermal stability such as benzene, aniline, benzonitrile, phenylenediamine, and dibenzonitrile.

As discussed above, the aqueous-based suspension-solution binder compositions may also include various modifiers and/or additives in order to achieve the desired properties. In some embodiments, conductive additives, including but not limited to, Super P, carbon black, graphite, graphene, carbon nano/micro fibers, carbon nanotubes, porous (meso/macro) carbons and other types of one-, two-, three-dimensional carbon materials may be introduced into the polymer binder compositions. In other embodiments, metallic nano/micro particles, fibers, wires and other types of one-, two-, three-dimensional structures may be introduced into the binder compositions. In further embodiments, graphite/graphene/pyrolytic carbon-based anodes may be used in energy storage devices not limited to Li-ion batteries.

The "suspension-solution" binder compositions disclosed herein have many advantages over conventional systems, including but not limited to, (1) environmentally friendly; (2) increased cycle life; (3) ability to use water insoluble polymers in aqueous based system; (4) decrease anode/cell swelling; (5) reduced cost; (6) faster processing; (7) improved anode adhesion; and (8) improved manufacturing ability.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry, or a device is "operable" to perform a function whenever the battery, circuitry, or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of forming an electrode, the method comprising:
    creating an electrode coating layer from an electrode slurry comprising silicon powder and a binder composition, where the binder composition comprises a water-insoluble polymeric component and a water-soluble polymer component;
    fabricating a battery electrode by coating the slurry on a current collector; and
    pyrolyzing said electrode coating layer;
    wherein said water-soluble polymer component comprises an aqueous solution of a water soluble polymer.

2. The method according to claim 1, wherein said water-insoluble polymeric component is a nano-micro size solid polymer component.

3. The method according to claim 2, wherein said nano-micro size solid polymer component comprises particulates, beads, flakes or rods.

4. The method according to claim 1, wherein said water-insoluble polymeric component comprises an insoluble polymer powder.

5. The method according to claim 1, wherein said water-insoluble polymeric component is one or more of polyacrylonitrile (PAN), polyetherimide (PEI), PAI (poly amide-imide), polyimine and polyimide (PI).

6. The method according to claim 1, wherein said water-soluble polymer is one or more of carboxymethyl cellulose (CMC), sucrose, poly(acrylic acid) (PAA), poly(vinyl alcohol) (PVA), starch, chitosan, lignin, and gums.

7. The method according to claim 1, wherein said electrode coating layer is dried, resulting in an electrode coating layer comprising a layer of dried solids.

8. The method according to claim 7, wherein said electrode coating layer comprising a layer of dried solids is further pyrolyzed into carbon during making of the electrode.

9. The method according to claim 8, wherein said electrode coating layer has a char yield upon pyrolysis of 40-60% by weight.

10. The method according to claim 1, wherein having one or more additional component in the binder composition.

11. The method according to claim 10, wherein said additional component is a conductive additive.

12. The method according to claim 11, wherein said conductive additive comprises one or more of Super P, carbon black, graphite, graphene, carbon nano/micro fibers, carbon nanotubes, and porous (meso/macro) carbons.

13. The method according to claim 1, wherein the electrode is in electrical and physical contact with an electrolyte, the electrolyte comprising a liquid, solid, or gel.

14. The method according to claim 1, wherein the battery electrode is in a lithium ion battery.

* * * * *